US010251100B2

(12) United States Patent
Masini et al.

(10) Patent No.: US 10,251,100 B2
(45) Date of Patent: Apr. 2, 2019

(54) METHODS, SOURCE NETWORK NODE AND TARGET NETWORK NODE FOR HANDOVER OF A WIRELESS COMMUNICATION DEVICE

(71) Applicant: Telefonaktiebolaget LM Ericsson (publ), Stockholm (SE)

(72) Inventors: Gino Masini, Stockholm (SE); Markus Drevö, Linköping (SE); Torsten Dudda, Aachen (DE); Vesa Lehtovirta, Espoo (FI); Helka-Liina Määttanen, Helsinki (FI); Alexander Vesely, Feldbach (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 102 days.

(21) Appl. No.: 15/327,415

(22) PCT Filed: Nov. 30, 2016

(86) PCT No.: PCT/SE2016/051184
§ 371 (c)(1),
(2) Date: Jan. 19, 2017

(87) PCT Pub. No.: WO2017/171600
PCT Pub. Date: Oct. 5, 2017

(65) Prior Publication Data
US 2018/0192331 A1 Jul. 5, 2018

Related U.S. Application Data

(60) Provisional application No. 62/316,627, filed on Apr. 1, 2016.

(51) Int. Cl.
*H04W 36/00* (2009.01)
*H04W 84/04* (2009.01)
(Continued)

(52) U.S. Cl.
CPC ... *H04W 36/0033* (2013.01); *H04W 36/0027* (2013.01); *H04W 36/0069* (2018.08);
(Continued)

(58) Field of Classification Search
CPC .......................... H04W 36/0033; H04W 84/12
See application file for complete search history.

(56) References Cited

U.S. PATENT DOCUMENTS

2015/0109927 A1* 4/2015 Ozturk .............. H04W 36/0027
370/235

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.4.0, Jun. 2016, 1-310.
(Continued)

Primary Examiner — Kiet Tang
(74) Attorney, Agent, or Firm — Murphy, Bilak & Homiller, PLLC

(57) ABSTRACT

A method performed by a source network node for handover of a wireless communication device in a first wireless communications network using a first RAT is provided. The handover is to be performed from the source network node to a target network node. The wireless communication device is configured to communicate with the source network node directly and to communicate with the source network node via a radio access node in a second wireless communications network using a second RAT.
The source network node provides (401) the target network node with information about parameters relating to a communication between the wireless communication device and the source network node via the radio access node.
The source network node receives (402) a feedback from the target network node. The feedback comprises an indication
(Continued)

LTE of whether or not the radio access node was able to keep a context of the wireless communication device in the second wireless communications network. The context comprises an identity of the wireless communication device in the second wireless communications network, and information required to interact with the wireless device in the second wireless communications network.

46 Claims, 10 Drawing Sheets

(51) Int. Cl.
    *H04W 84/12*     (2009.01)
    *H04W 92/20*     (2009.01)
(52) U.S. Cl.
    CPC .......... *H04W 84/042* (2013.01); *H04W 84/12* (2013.01); *H04W 92/20* (2013.01)

(56) References Cited

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.2.0, Jun. 2016, 1-623.
3GPP, "3rd Generation Partnership Project; Technical Specification Group Radio Access Network; Evolved Universal Terrestrial Radio Access Network (EUTRAN) and Wireless LAN (WLAN); Xw application protocol (XwAP) (Release 13)", 3GPP TS 36.463 V13.1.0, Jun. 2016, 1-94.
3GPP, "3rd Generation Partnership Project; Technical Specification Group Radio Access Network; Evolved Universal Terrestrial Radio Access Network (E-UTRAN); X2 application protocol (X2AP) (Release 13)", 3GPP TS 36.423 V13.4.0, Jun. 2016, 1-238.
3GPP, "3rd Generation Partnership Project; Technical Specification Group Radio Access Network; Study on Small Cell enhancements for E-UTRA and E-UTRAN; Higher layer aspects (Release 12)", 3GPP TR 36.842 V12.0.0, Dec. 2013, 1-71.
Unknown, Author, "Agenda", 3GPP TSG-RAN WG3 #92, R3-16xxxx, Chairman, Nanjing, P.R. China, May 23-27, 2016, 1-53.
Unknown, Author, "Agenda", 3GPP TSG-RAN WG3 #93, R3-16xxxx, Chairman, Göteborg, Sweden, Aug. 22-26, 2016, 1-54.
Unknown, Author, "LTE mobility in LWA", NEC, 3GPP TSG RAN WG2 Meeting #92, R2-156617, Anaheim, USA, Nov. 16-20, 2015, 1-3.
Unknown, Author, "LWA configuration handling upon handover", Huawei, HiSilicon, 3GPP TSG-RAN WG2 Meeting #93, R2-161580, St. Julian's, Malta, Feb. 15-19, 2016, 1-7.
Unknown, Author, "X2AP Support for Inter-eNB Mobility without WT Change", Ericsson, 3GPP TSG-RAN WG3 Meeting #91bis, Change Request, R3-160905, Bangalore, India, Apr. 11-15, 2016, 1-32.

* cited by examiner

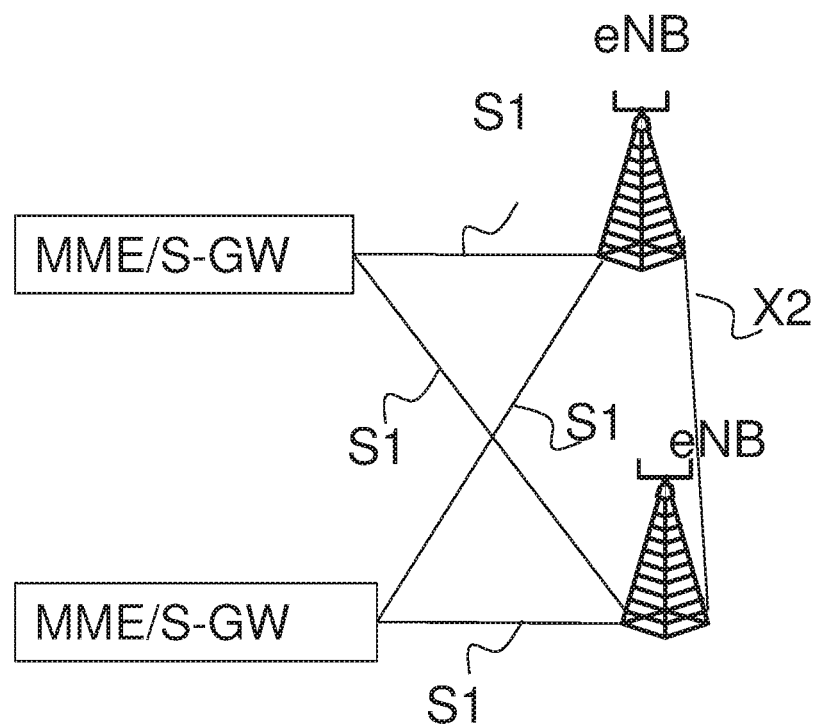
Fig. 1b LTE

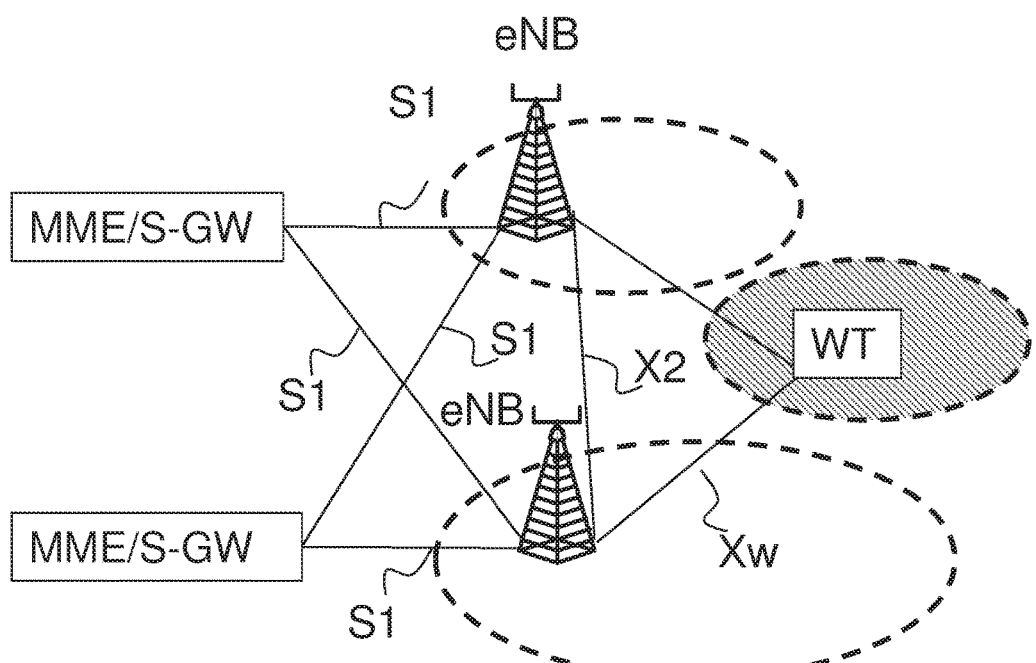
Fig. 1c LWA non co-located case

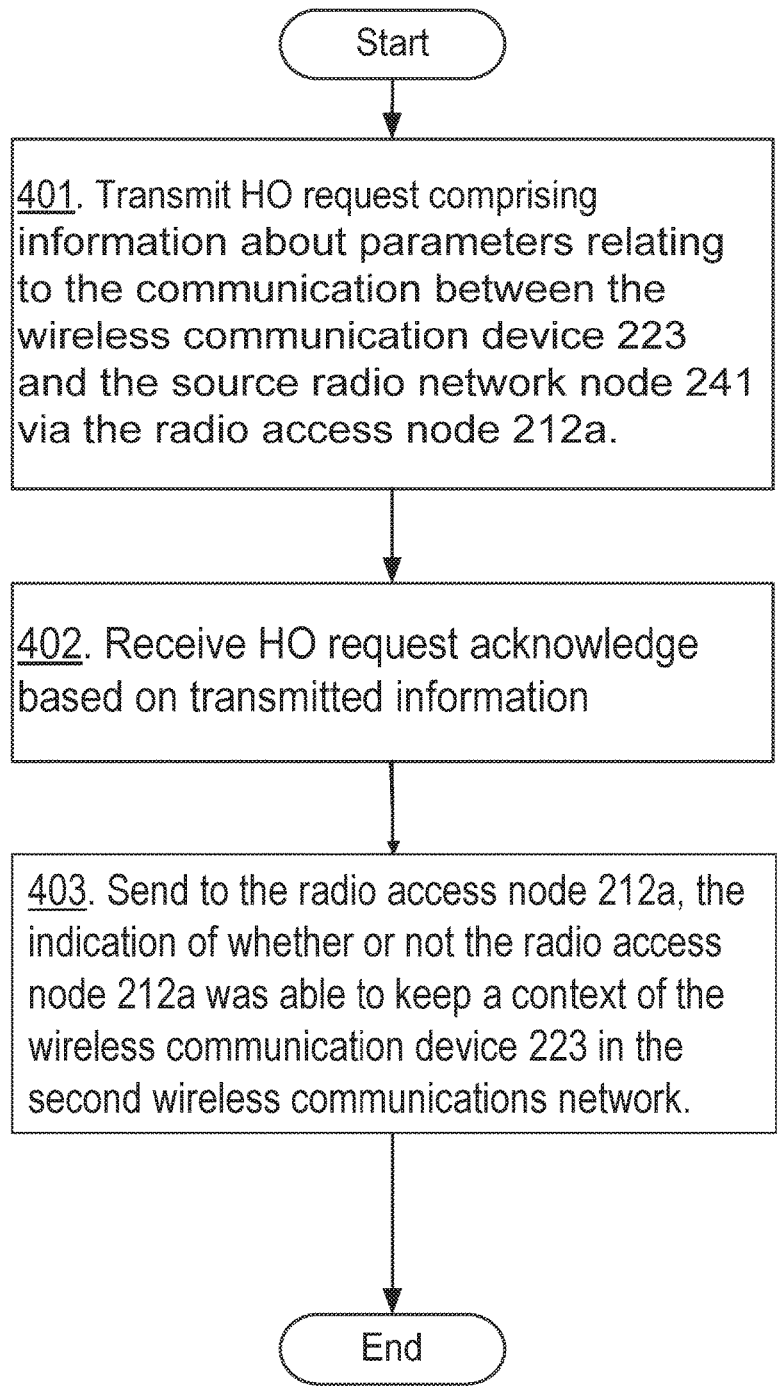
Fig. 4 Method in source network node (eNB) 241

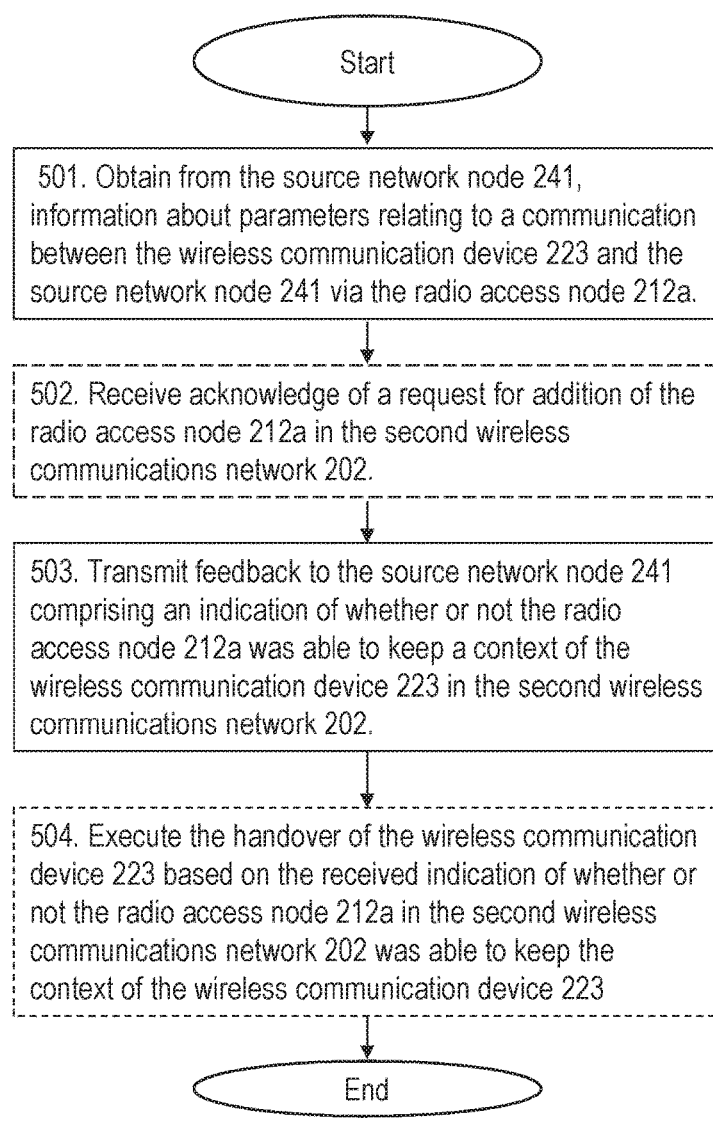
Fig. 5a Method in target network node (eNB) 242

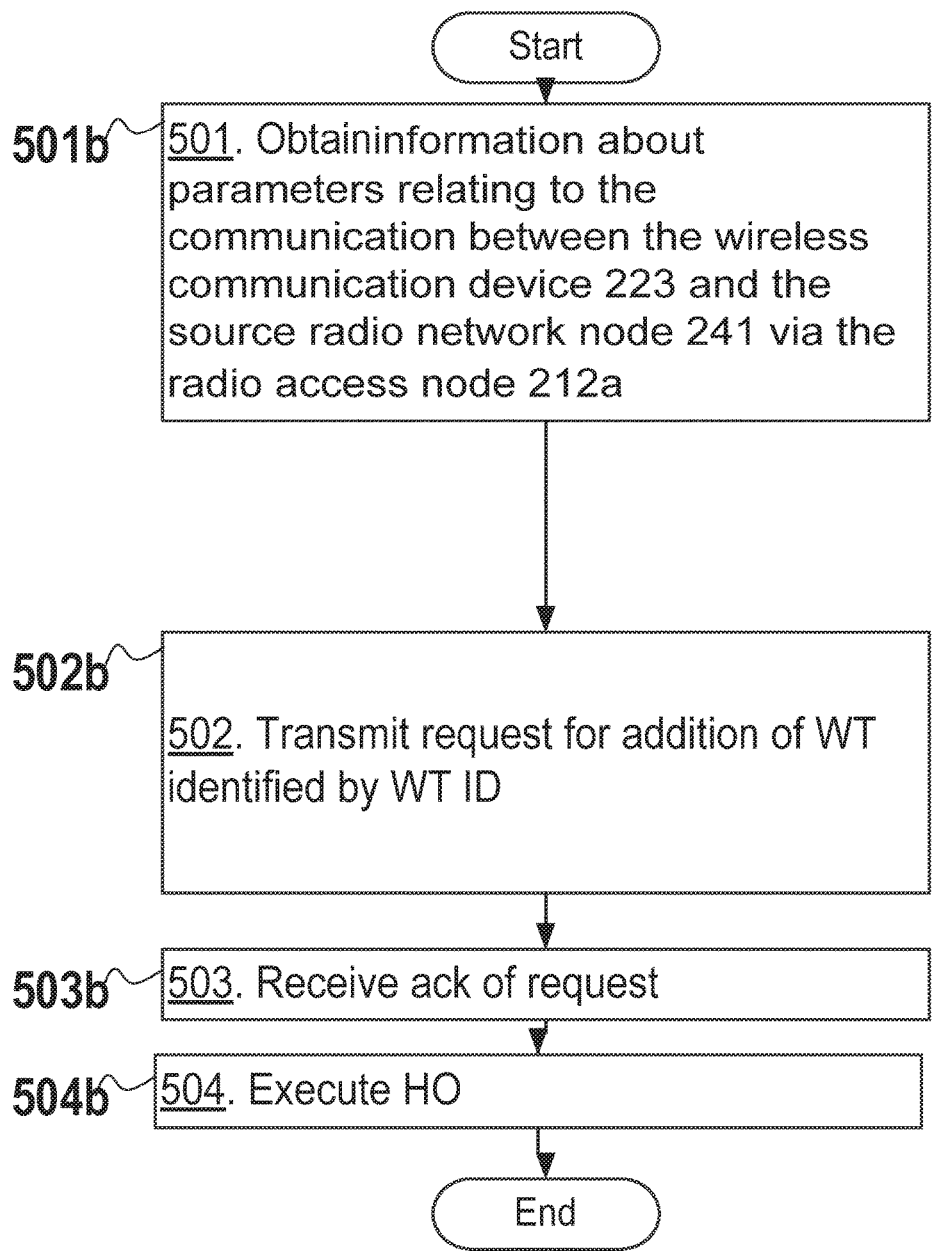
Fig. 5b Method in target network node (eNB) 242

METHODS, SOURCE NETWORK NODE AND TARGET NETWORK NODE FOR HANDOVER OF A WIRELESS COMMUNICATION DEVICE

BACKGROUND

Wireless devices or terminals for communication are also known as e.g. User Equipments (UE), mobile terminals, wireless terminals and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server, such as server providing video streaming service, via a Radio Access Network (RAN) and possibly one or more core networks, comprised within the cellular communications network.

Wireless devices may further be referred to as mobile telephones, cellular telephones, computers, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

A cellular communications network covers a geographical area which is divided into cell areas, wherein each cell area is served by a base station, e.g. a Radio Base Station (RBS), which sometimes may be referred to as e.g. eNodeB (eNB), NodeB, B node, Base Transceiver Station (BTS), or Access Point (AP), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. The base stations and wireless devices involved in communication may also be referred to as transmitter-receiver pairs, where the respective transmitter and receiver in a pair may refer to a base station or a wireless device, depending on the direction of the communication. Two wireless devices involved in device-to-device (D2D) communication may also be referred to as a transmitter-receiver pair. In the context of this disclosure, the expression Downlink (DL) is used for the transmission path from the base station to a wireless device. The expression Uplink (UL) is used for the transmission path in the opposite direction i.e. from the wireless device to the base station.

Universal Mobile Telecommunications System (UMTS) is a third generation mobile communication system, which evolved from the GSM, and is intended to provide improved mobile communication services based on Wideband Code Division Multiple Access (WCDMA) technology. UMTS Terrestrial Radio Access Network (UTRAN) is essentially a radio access network using wideband code division multiple access for communication with terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission in LTE is controlled by the radio base station.

LWA

LTE-WLAN Aggregation (LWA) is a feature where a UE may receive and transmit using radio links to both an eNB and a Wireless Local Area Network (WLAN). It is part of 3GPP Release-13. In the split bearer architecture option, also denoted as 3C of LWA, the downlink data is split on the Packet Data Convergence Protocol (PDCP) layer in the eNB, 3C here and 2C below refer to option numbers in Release-12 TR for dual connectivity in 3GPP, TS 36.842. The eNB may route PDCP Packet Data Units (PDUs) dynamically via eNB Radio Link Control (RLC) to the UE directly, or via a backhaul channel to WLAN and then to the UE. In the separate bearer architecture, also denoted 2C, the lower layers of a bearer are switched to LTE or WLAN meaning that all PDCP packets of that bearer are routed via either LTE or WLAN side. FIG. 1a shows the protocol architecture for LWA wherein RRC means Radio Resource Control
MAC means Medium Access Control
PHY means Physical layer
IP means Internet Protocol The WLAN termination point in the network, denoted WT, may be implemented by a WLAN AP and/or Access Controller (AC) or any other network node. The interface protocol between eNB and WT is denoted Xw.

The following characteristics are described in 3GPP TS 36.300 Rel-13. Note that this is not a complete list:

E-UTRAN supports LWA operation whereby a UE in RRC_CONNECTED mode is configured by the eNB to utilize radio resources of LTE and WLAN.

The eNB supporting LWA is connected to WLAN via an ideal/internal backhaul in the collocated deployment scenario or a non-ideal backhaul in the non-collocated deployment scenario.

In the non-collocated scenario, the eNB is connected to a WT logical node.

The Xw User Plane (UP) interface (Xw-U) and the Xw Control Plane (CP) interface (Xw-C) are defined between eNB and WT.

The UE supporting LWA may be configured by the E-UTRAN to perform WLAN measurements.

The eNB provides the UE with a "mobility set", i.e. a group of APs, e.g. by Service Set Identifier (SSID), Homogeneous Extended Service Set Identifier (HESSID) or Basic Service Set Identifier (BSSID), among which WLAN mobility mechanisms apply while still supporting LWA, i.e., the UE may perform mobility within a group of APs transparently to the eNB. UE mobility across such groups of APs is controlled by the eNB e.g. based on measurement reports provided by the UE.

SUMMARY

It is therefore an object of embodiments herein to improve the performance in a wireless communications system.

According to a first example aspect of embodiments herein, the object is achieved by a method performed by a source network node for handover of a wireless communication device in a first wireless communications network using a first Radio Access Technology, RAT. The first RAT may be a 3GPP RAT, e.g. a 3GPP cellular RAT, such as LTE. The handover is to be performed from the source network node to a target network node. The wireless communication device is configured to communicate with the source network node directly e.g. through a source cell, and to communicate with the source network node via a radio access node such as a WLAN Termination (WT) in a second wireless communications network using a second RAT. The second RAT may e.g. be a WLAN.

The source network node provides the target network node with information about parameters relating to a communication between the wireless communication device and the source network node via the radio access node.

The source network node receives a feedback from the target network node. The feedback comprises an indication of whether or not the radio access node was able to keep a context of the wireless communication device in the second wireless communications network.

The indication is derived based on the information about the parameters. The context comprises an identity of the wireless communication device in the second wireless communications network, and information e.g. be a mobility set, defined as the set of network identifiers required to interact with the wireless device in the second wireless communications network.

According to a second example aspect of embodiments herein, the object is achieved by a method performed by a target network node for handover of a wireless communication device in a first wireless communications network using a first Radio Access Technology, RAT. The first RAT may be a 3GPP RAT, e.g. a 3GPP cellular RAT, such as LTE. The handover is to be performed from a source network node to the target network node. The wireless communication device is configured to communicate with the source network node directly, e.g. through a source cell, and to communicate with the source network node via a radio access node such as a WT in a second wireless communications network using a second RAT. The second RAT may be a WLAN.

The target network node obtaining from the source network node, information about parameters relating to a communication between the wireless communication device and the source network node via the radio access node.

The target network node transmits a feedback to the source network node. The feedback comprises an indication of whether or not the radio access node was able to keep a context of the wireless communication device in the second wireless communications network. The indication is derived based on the information about the parameters. The context comprises an identity of the wireless communication device in the second wireless communications network, and information required to interact with the wireless device in the second wireless communications network.

According to a third example aspect of embodiments herein, the object is achieved by a source network node for handover of a wireless communication device in a first wireless communications network using a first Radio Access Technology, RAT. The handover is to be performed from the source network node to a target network node. The wireless communication device is configured to communicate with the source network node directly and to communicate with the source network node via a radio access node in a second wireless communications network using a second RAT. The source network node is configured to:

Provide the target network node with information about parameters relating to a communication between the wireless communication device and the source network node via the radio access node, Receive a feedback from the target network node, which feedback comprises an indication of whether or not the radio access node was able to keep a context of the wireless communication device in the second wireless communications network, which indication is derived based on the information about the parameters, and which context comprises an identity of the wireless communication device in the second wireless communications network, and information required to interact with the wireless device in the second wireless communications network.

According to a fourth example aspect of embodiments herein, the object is achieved by a target network node for handover of a wireless communication device in a first wireless communications network using a first Radio Access Technology, RAT. The handover is to be performed from a source network node to the target network node. The wireless communication device is configured to communicate with the source network node via a radio access node in a second wireless communications network using a second RAT. The target network node is configured to:

Obtain from the source network node, information about parameters relating to a communication between the wireless communication device and the source network node via the radio access node, and transmit a feedback to the source network node, which feedback comprises an indication of whether or not the radio access node was able to keep a context of the wireless communication device in the second wireless communications network. The indication is derived based on the information about the parameters. The context comprises an identity of the wireless communication device in the second wireless communications network, and information required to interact with the wireless device in the second wireless communications network.

Since the source network node transmits information about the parameters relating to the communication between the wireless communication device and the source network node via the radio access node, the handover of the wireless device from the source network node to target network node is improved since the wireless device will be configured for the new connection in the second wireless communications network faster.

If it receives the indicator that the context can be kept, the source network node knows that the radio access node has agreed to keep the communication via the radio access node in the second wireless communications network using the second RAT, i.e. the second network connection, ongoing. Therefore, radio access node can proceed with the handover in the first wireless communications network knowing that the connection to the second network connection is being maintained. It will send that request to the radio access node only after the handover in the first wireless communications network has completed, but with the indication to keep the context, this tells the radio access node to only remove the part of the context related to the source network node and not the complete UE context.

BRIEF DESCRIPTION OF THE DRAWINGS

Examples of embodiments herein are described in more detail with reference to attached drawings in which:

FIG. 1b is a schematic block diagram illustrating a wireless communications network according to prior art.

FIG. 1c is a schematic block diagram illustrating a wireless communications network according to prior art.

FIG. 4 is a flowchart depicting embodiments of a method in a source network node.

FIG. 5a is a flowchart depicting embodiments of a method in a target network node.

FIG. 5b is a flowchart depicting embodiments of a method in a target network node.

DETAILED DESCRIPTION

As part of developing embodiments, a problem will first be identified and discussed. Please note that the terms "UE" and "user equipment" are used interchangeably in this document.

Figure 1A:
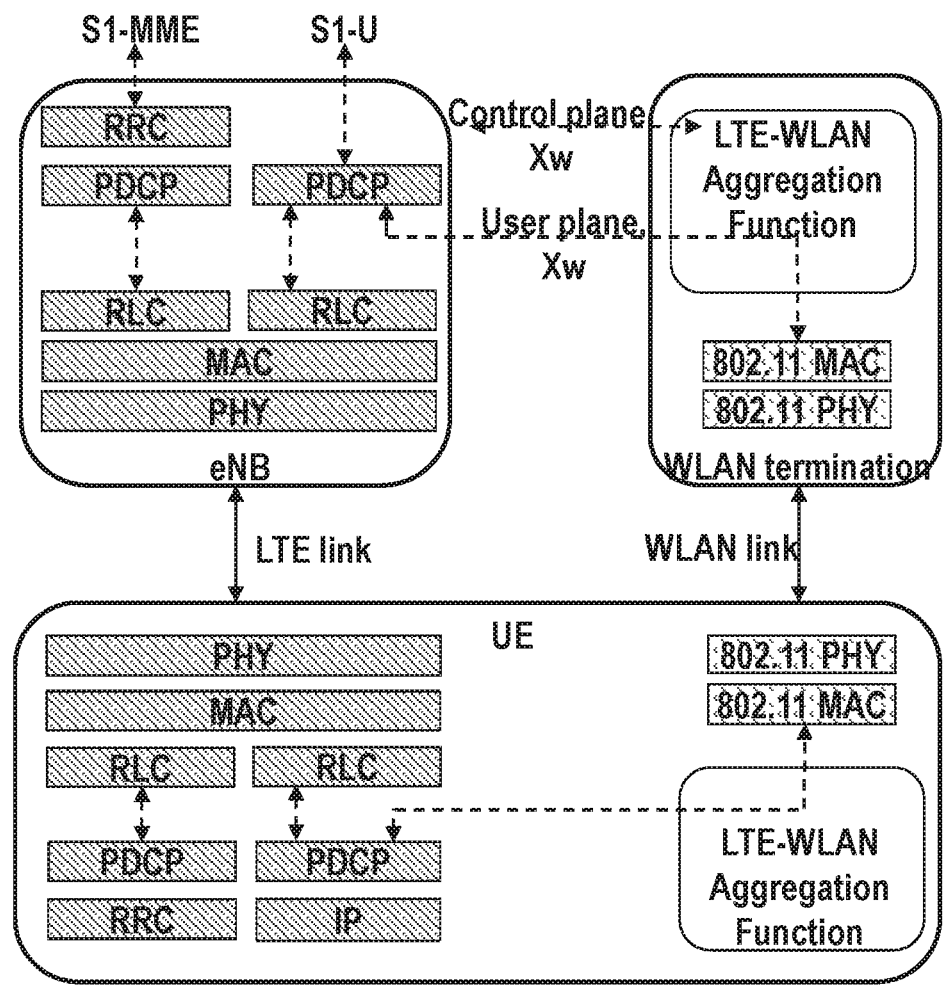
FIG. 1a is a schematic block diagram illustrating a LWA protocol according to prior art.

FIG. 1a depicts LWA protocol architecture according to prior art.

FIG. 1b depicts an LTE architecture according to prior art.

FIG. 1c depicts an LWA architecture non-co-located case according to prior art.

In case of inter-eNB mobility for the UE, where the target eNB has Xw interface to the same WT as the source eNB, performing the HO according to Release 13 is not that efficient as there are no means to prepare network nodes for faster reconfiguration of the LWA at the target eNB. Further, currently there are also no means to configure UE for LWA for the target eNB via the source eNB. This leads to unnecessary long service interruptions for the UE LWA connection.

This may cause packet loss and/or service interruption. This is unnecessary and can be particularly severe in a scenario where several small LTE cells overlap with APs connected to the same WT.

According to some example embodiments herein a method is provided for inter- and intra-eNB UE handover in conjunction with LWA without WT change, without the need for WLAN service interruption.

Figure 2:
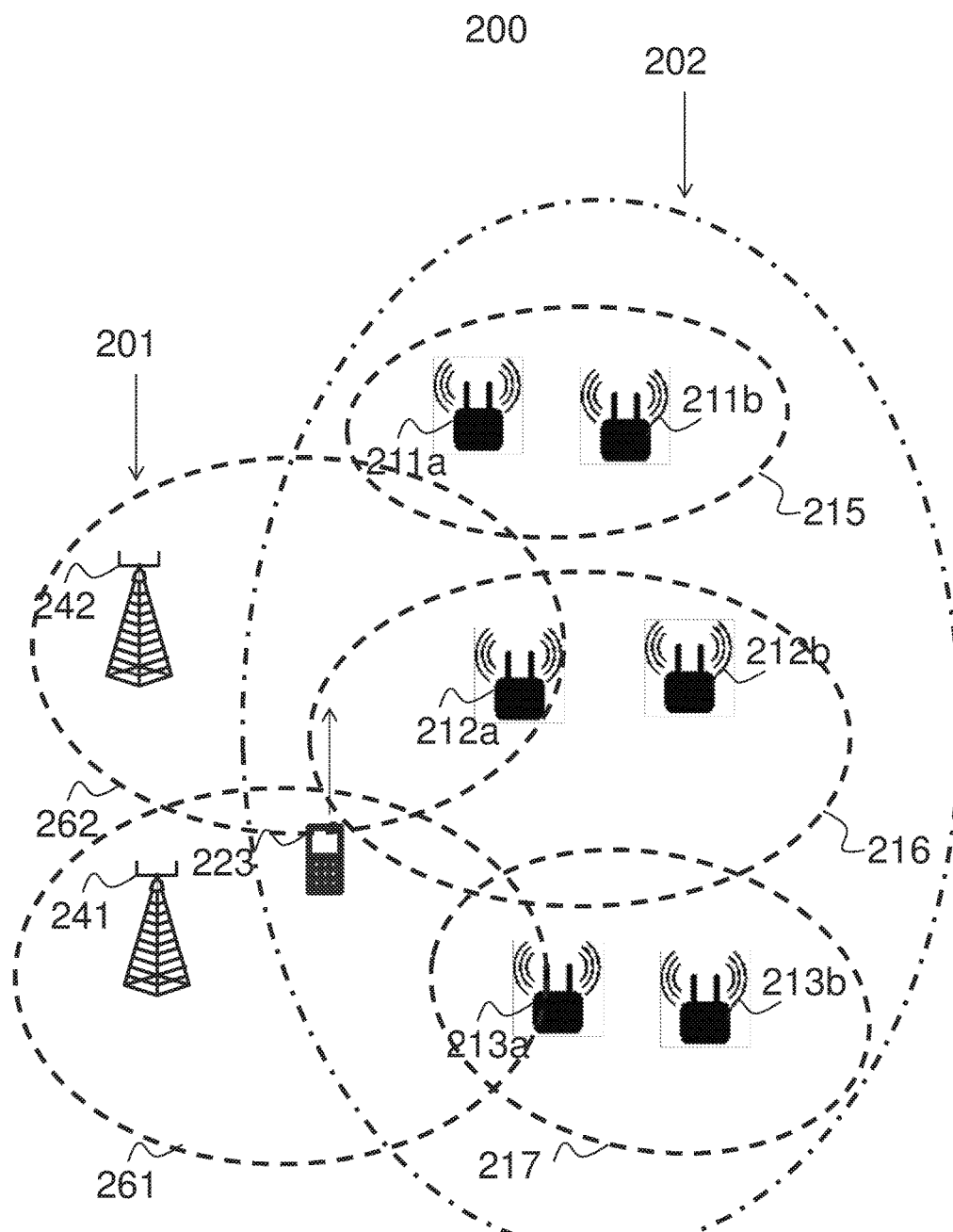
FIG. 2 is a schematic block diagram illustrating embodiments of a wireless communications network.

FIG. 2 depicts an example of a wireless communications network 200 in which embodiments herein may be implemented. The wireless communications network 200 may comprise a first wireless communications network 201 using a first Radio Access Technology (RAT), and a second wireless communications network 202 using a second RAT. The first wireless communications network 201 may e.g. be any of: LTE, WCDMA, GSM network, any 3GPP cellular network, Wimax, Fifth Generation 5G 5G/NR or any cellular network or system. The second wireless communications network 202 may e.g. be a WLAN, a WiFi network or any similar network. However, it may also be the other way around.

A plurality of network nodes operate in the wireless communications network 200 such as e.g. a source network node 241 and a target network node 242. The source network node 241 and the target network node 242 may for example be an eNodeB, a NodeB, a Home Node B, a Home eNode B, a WiFi Access Point (AP) or any other network node capable to serve a UE in a wireless communications network. The source network node 241 and the target network node 242 both operate in the first wireless communications network 201. The source network node 241 serves a source cell and the target network node 242 serves a target cell. The first wireless communications network 201 is exemplified herein as an LTE network. The second wireless communications network 202 is exemplified herein as an WLAN network.

A wireless communication device 223 operates in the wireless communications network 200. In an example scenario the wireless communication device 223 is to be handed over from the source network node 241 to the target network node 242.

The wireless communication device 223 may e.g. be a wireless device, a user Equipment (UE), a mobile wireless terminal or a wireless terminal, a mobile phone, a Station (STA), a computer such as e.g. a laptop, a Personal Digital Assistants (PDAs) or a tablet computer, sometimes referred to as a surf plate, with wireless capability, or any other radio network unit capable to communicate over a radio link in a wireless communications network. Please note the term wireless communication device may be used interchangeably with the term UE used in this document, which also covers other wireless devices such as Machine to machine (M2M) devices.

According to a first example aspect of embodiments herein, a method performed by the source network node 241 is provided for handover of a wireless communication device 223 in a first wireless communications network 201 using a first Radio Access Technology, RAT. See FIGS. 2, 3, 4. The handover may e.g. be performed between a source cell 261 and a target cell 262. The source cell 261 may be associated with the source network node 241 and the target cell may be associated with the target network node 242. In some embodiments the source network node 241 and the target network node 242 are the same type of logical node.

The wireless communication device 223 is configured to communicate with the source network node 241 directly, e.g. through the source cell 261. The first RAT may be a 3GPP RAT, e.g. a 3GPP cellular RAT, such as LTE.

The wireless communication device 223 is further configured to communicate with the source network node 241 via a radio access node 212a, such as a WLAN Termination in a second wireless communications network 202 using a second RAT. The second RAT may be a WLAN.

In the second wireless communications network 202, radio access nodes capable of communicating with wireless communications devices operate. For example, one or more first radio access nodes 211a, 211b capable of radio communication with wireless communications devices operates in the second wireless communications network 202. The one or more first radio access node 211a, 211b are configured to operate in the second wireless communications network 202. The one or more first radio access nodes 211a, 211b may also be referred to as radio base stations and e.g. eNBs, eNodeBs, base transceiver stations, Access Point Base Stations, base station routers, or any other network units capable of radio communication with wireless communications devices.

Further, there may be further radio access nodes operating in the first wireless communications network 201. For example, there may be one or more second radio access nodes 212a, 212b and one or more third radio access nodes 213a, 213b as illustrated in FIG. 2.

The one or more radio access nodes 211a, 211b, 212a, 212b, 213a, 213b are exemplified as APs in embodiments herein.

As mentioned above, a WLAN is a network of one or more APs, and may be addressed with SSIDs, HESSIDs or BSSIDs.

In embodiments herein, the one or more first radio access nodes 211a, 211b may be referred to as a first radio access network 215. This first radio access network 215 may e.g. be a first WLAN. Further, the one or more second radio access nodes 212a, 212b may be referred to as a second radio access network 216. Yet further, the one or more third radio access nodes 213a, 213b may be referred to as a third radio access network 217. The second radio access network 216 and the third radio access network 217 may also be WLANs.

According to a second example aspect of embodiments herein, a method performed by the target network node 242 is provided for handover of a wireless communication device 223 in a first wireless communications network 201 using a first Radio Access Technology, RAT. See FIGS. 2, 3 and 5.

The handover may e.g. be performed between a source cell 261 and a target cell 262. The source cell 261 may be associated with a source network node 241 and the target cell 262 may be associated with the target network node 242. In some embodiments the source network node 241 and the target network node 242 are the same type of logical node.

The wireless communication device 223 is configured to communicate with the source network node 241 directly, e.g. through the source cell 261. The first RAT may be a 3GPP RAT, e.g. a 3GPP cellular RAT, such as LTE.

The wireless communication device 223 is further configured to communicate with a source network node 241 via a radio access node 212a, such as a WLAN Termination in a second wireless communications network 202 using a second RAT. The second RAT may be a WLAN.

A handover preparation may be triggered by the mobility of the wireless communication device 223. For example the wireless communication device 223 may be moving from the source cell 261 to the target cell 262.

Embodiments herein are described within the context of integration of LTE and WLAN. It should be understood that the problems and solutions described herein are equally applicable to wireless access networks and wireless communication devices such as UEs implementing other access technologies and standards. LTE and WLAN are used as example technologies where the invention is suitable, and using LTE and WLAN in the description therefore is particularly useful for understanding the problem and solutions solving the problem.

The first RAT may be a 3GPP RAT, e.g. a 3GPP cellular RAT, such as LTE, and second RAT may be a WLAN. In the examples below the first RAT relates to LTE and the second RAT relates to a WLAN.

The source network node 241 is referred to as the source eNB in the following examples, the target network node 242 is referred to as the target eNB in the following examples. The wireless communication device 223 is referred to as the UE in the following examples and is undergoing handover. The radio access node 212a is referred to as the WT in the following examples.

During inter-eNB LTE Handover (HO) preparation, the source eNB signals to the target eNB information about parameters relating to a communication between the wireless communication device 223 and the source network node 241 via the radio access node 212a, such as e.g. the information about the LWA connection possibly including e.g. the mobility set and the relevant WLAN parameters of the UE undergoing handover. Assuming both target and source eNBs already have an Xw interface set up with the relevant WT, the target eNB may initiate preparation of the LWA UE context towards the radio access node 212a which is referred to as WT in the following examples, which signals back whether the UE context can be kept. The target eNB then signals the proposed new UE configuration, optionally including the LWA configuration part and/or WLAN measurement configuration, to the source eNB as part of the handover procedure. When the UE is reconfigured and connects to the target LTE cell and if LWA configuration is included, the UE may also re-associate with the WLAN with a new Security Key (S-Kwt) derived from an LTE security key also referred to as the KeNB. If WLAN measurement configuration is included, the UE applies the new measurement configuration. If a LWA/WLAN measurement configuration is not included, the target eNB may configure LWA/WLAN measurements for that UE after the HO is finished.

For intra-eNB HO case, the target eNB preparations are not needed but the UE may still be reconfigured to LWA with the RRC reconfiguration message including mobility control info. In this case, as above the UE is provided with new WT counter, possibly modified mobility set and bearer configuration.

Embodiments herein comprises e.g. the following advantages:
  It may help avoiding loss of data enciphered by the source eNB after the handover is performed, hence improving performance at handover.
  It enables the target eNB to prepare the LWA connection before the UE arrives at the target cell and before the source eNB requests its release, thus providing a robust "make-before-break" mechanism;
  It enables the target eNB receiving the mobility set and/or WLAN measurements for the UE, to either use it as a "starting point" for further configuring the UE, or replace/modify it with a "known good" mobility set for the target cell, e.g. created from previous measurements of other UEs according to Self Organized Network (SON) mechanisms, thus helping to minimize LWA service interruption;
  The information on whether the WT was able to keep the UE context is fed back to the source eNB, so that it may decide the best strategy also in case of multiple handover preparations.
  If the target eNB sends the LWA configuration such as e.g. WT counter, mobility set, bearer configuration, to the UE via the source eNB, the UE may re-associate faster with the WLAN. In most practical scenarios, the source and target eNBs will overlap with APs connected to the same WT, so the UE context, including the mobility set, can be kept in the same WT without (or with very little) modification;
  For intra-eNB HO, the UE may be reconfigured to LWA with the RRC reconfiguration message including mobility control info, which makes the continuation of LWA smoother.

Embodiment's herein will now be further described and explained. The text below is applicable to and may be combined with any suitable embodiment described above.

Inter-eNB Handover (HO)

Figure 3:
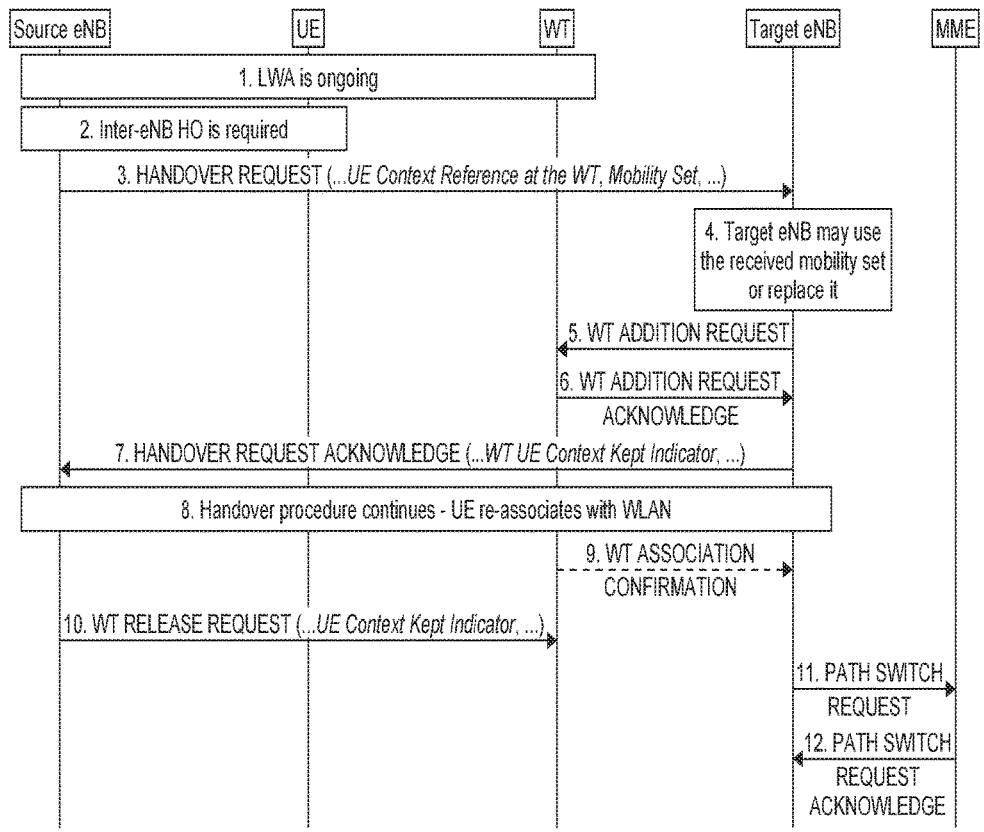
FIG. 3 is a sequence diagram depicting embodiments of a method.

A signal flow for a first embodiment where an LTE handover is triggered for an UE with ongoing LWA, is shown in FIG. 3. The LWA connection of the UE is towards APs connected to the same WT. It is assumed that both source and target eNBs have already set up Xw interfaces to the same WT. The example actions may be as follows:

1. an LWA for the UE, between the source eNB and the WT, is ongoing;
2. An inter-eNB HO is required, e.g. due to UE mobility, following UE measurements which indicate better radio condition for the LTE cell belonging to the target eNB, etc.;
3. The source eNB initiates the Handover Preparation procedure by sending to the target eNB an X2AP HANDOVER REQUEST message including the information about parameters relating to a communication between the UE and the source eNB via the WT, e.g. comprising the following information:
   a. The UE Context Reference at the WT Information Element (IE), which may include;
      i. The WT ID of the WT with which LWA is ongoing;
      ii. The WLAN identity of the UE for which handover is being prepared—this may be a UE WLAN MAC address, which the UE had previously signaled to the eNB as part of the capability information over RRC;
      iii. The mobility set currently configured for the UE, as defined by 3GPP TS 36.463 Release 13.
   b. Optionally, the latest available WLAN measurements from the UE, included as additional information in the RRC Context IE as defined by 3GPP TS 36.423 and 36.331;
   c. Optionally the BSSID of the WLAN AP currently used if available, e.g. if the WT has a mechanism to provide this information to the source eNB, or if it is received from the UE. This BSSID may be used by the target eNodeB to select an appropriate mobility set for the UE.
4. The target eNB may either use the received information, in particular the mobility set, and if available, the latest available WLAN measurements, as a starting point for further configuring the UE, or to replace and/or modify it with a known good mobility set for the target cell, e.g. created from previous measurements of other UEs according to SON mechanisms. If the WLAN AP currently used is known in the target eNB this information could also be used to select an appropriate mobility set. The target eNB derives a new key S-Kwt using the KeNB received in step 3 and a WT counter.
5. The target eNB initiates a WT Addition Preparation procedure to the WT by sending an XwAP WT ADDITION REQUEST message, including the information about the parameters relating to a communication between the UE and the source eNB via the WT it received in Step 3, together with an appropriate mobility set and the new WLAN security key S-Kwt for the same UE. The WT may start to use the new key S-Kwt only when the UE re-associates to WLAN using the same key, see step 8b.
   a. In one embodiment, the WT shall flush all buffered DL PDCP data received from the source eNB, because this data is encrypted based on an old PDCP, i.e. KeNB, key, which is about to be changed in step 8, when the handover is executed in the UE.
   b. In yet another embodiment, the WT shall flush all buffered DL PDCP data received from the source eNB, only when the UE re-associates to WLAN after this step 5. Thereby it is assumed that the UE only re-associates after this step 5 in case a handover is triggered in the UE, including PDCP reestablishment, where the PDCP encryption key, i.e. KeNB, is changed. E.g. the source eNB sends data based on old key, and target eNB sends data based on new key.
   c. In one embodiment, the WT forwards received UL PDCP data from the UE to the source eNB as long as no WLAN re-association has been done after this step 5, afterwards the UE will forward UL PDCP data to the target eNB, or buffer UL PDCP data until a tunnel to the target eNB is established. Thereby it is assumed that the UE only re-associates after this step 5 in case a handover is triggered in the UE, including PDCP reestablishment, where the PDCP encryption key, i.e. KeNB, is changed. The source eNB must only receive data based on old key, and target eNB must only receive data based on new key.
6. If the WT is able to accommodate the request, it replies to the target eNB with the WT ADDITION REQUEST ACKNOWLEDGE message with the appropriate information. Upon receiving this message the target eNB derives the knowledge whether or not the WT was able to accommodate the UE.
7. The target eNB replies to the source eNB with the HANDOVER REQUEST ACKNOWLEDGE message, including the following information:
   a. The WT UE Context Kept Indicator IE indicating that the WT was able to keep the UE context. The target eNB may get to know whether the context can be kept e.g. by receiving the WT ADDITION REQUEST ACKNOWLEDGE message in the previous step; otherwise, the WT would have replied WT ADDITION FAILURE. In which case the X2 handover would continue as in legacy, without the WLAN part,
   b. Optionally including the LWA configuration and/or WLAN measurement for the UE, included as additional information in the Target eNB To Source eNB Transparent Container IE as defined by 3GPP TS 36.423 and 36.331;
      i. The LWA configuration includes at least WT counter such that the UE may derive new WLAN security key S-Kwt (i.e. the same key sent to WT by target eNB) for WLAN association, the mobility set and bearer configuration.
8. The Handover procedure continues, including RRC reconfiguration of the UE, the UE disconnecting from the source eNB serving the source cell and connecting to the target eNB serving the target cell;
   a. The UE performs a Random Access Procedure (RACH) to the target cell as in legacy HO.
   b. As in legacy HO, PDCP is reestablished. After the reestablishment, PDCP expects PDUs encrypted based on a new LTE security key, if configured so by the target eNB.
   c. If the configuration includes LWA configuration, after RACH to target cell UE has also reestablished PDCP. Then, the UE may start re-association to WLAN taking into account the mobility set provided in the LWA configuration, in case mobility set or WLAN security changed. After association, the UE sends WLAN association confirmation message to the target eNB, or failure as defined in Release 13, if configured to do so.
   d. If the configuration includes WLAN measurement configuration, the UE may start WLAN measurements independent of RACH to target sell.
9. The WT may send the WT ASSOCIATION CONFIRMATION message to the target eNB to indicate that the UE has successfully (re-)associated with the WLAN;
10. The source eNB sends the WT RELEASE REQUEST message to the WT and may include the UE Context Kept Indicator IE; the WT initiates the release of resources related to the UE-associated signaling connection between the source eNB and the WT.

a. In one embodiment, as alternative to 5a, when the UP tunnel between WT and source eNB had been released, the WT shall flush all buffered DL PDCP data received from the source eNB, because this data is encrypted based on an old PDCP key, which is or has been changed in step 8, when the handover is executed in the UE.

11. The target eNB initiates the Path Switch procedure by sending the PATH SWITCH REQUEST message to the MME;

12. The MME replies to the target eNB with PATH SWITCH REQUEST ACKNOWLEDGE message.

Since the source eNB transmits the identity of the WT, the WLAN ID of the UE, the mobility set and the security key related to PDCP in the HO request the handover of the UE from the source RAN node such as the source eNB to target RAN node such as the target eNB is improved since the UE is configured for the new LWA connection faster. For example, the target eNB may configure the new mobility set already in step 4, WT may be configured with new second mobility set and new second security key already in step 5.

If it receives the indicator that the context can be kept, the source eNB knows that the WT has agreed to keep the LWA ongoing. Therefore, it can proceed with the LTE handover without requesting the WT to remove the LWA first. It will send that request to the WT only after the LTE handover has completed, but with the "UE Context Kept Indicator": this tells the WT to only remove the part of the UE context related to the source eNB and not the complete UE context.

A second embodiment closely resembles the first embodiment above, with the following differences:

The WLAN UE identity sent from the source eNB to the target eNB in Step 3.*a.ii* above, is signaled using the WT UE XwAP ID IE, already assigned by the WT and previously signaled by the WT to the source eNB over UE-associated XwAP signaling for LWA. This avoids signaling the UE WLAN MAC address unnecessarily over X2.

The WT UE XwAP ID IE thus received, is signaled from the target eNB to the WT in the WT ADDITION REQUEST message as in Step 5 above instead of the WLAN MAC address, a dummy value may be inserted instead in the corresponding IE, the UE Identity IE defined by 3GPP TS 36.463.

The WT receiving the message in Step 5 notices the included WT UE XwAP ID IE and uses that information to correlate the UE identity with the existing context, ignoring the dummy value in the UE Identity IE.

In the previous steps, it may also be possible to use the eNB UE XwAP ID IE, already assigned by the source eNB when setting up LWA with the WI, instead of the WT UE XwAP ID IE. This alternative may be fully equivalent and would have the same benefits.

A third embodiment closely resembles the first and second embodiment above, with the following difference:

Instead of using the WT ADDITION REQUEST message a new message is used. This message by itself indicates to the WT that UE mobility is in progress.

A fourth embodiment introduces new messages before the WT ADDITION REQUEST, with the following difference:

The WT ADDITION REQUEST is used with the modifications that the WLAN MAC Address may be set to a dummy value and has support for exchanging WT UE XwAP ID IE and eNB UE XwAP ID IE. Before the WT ADDITION REQUEST message is sent a new message, which here is called WT MOBILITY PREPARATION is sent containing a reference to the UE in the source cell, such as e.g. UE WLAN MAC Address or WT UE XwAP ID. In case the WT UE XwAP ID is not unique in the WT, an identifier of the source eNB may also be needed, e.g. global eNodeB ID. The WT responds with the WT MOBILITY PREPARATION RESPONSE ACKNOWLEDGE acknowledging that it has found a matching UE in the source cell. Optionally the WT may also include an identifier of the WLAN AP currently in use in order to assist the target eNB to select a suitable mobility set. When the target eNB receives the WT MOBILITY PREPARATION RESPONSE message it selects a suitable mobility set sends this to WT in the WT ADDITION REQUEST message. Further the target eNB may also include, in the HANDOVER REQUEST ACKNOWLEDGE message, the selected mobility set. The source eNB may then configure the UE with the new mobility set when sending the RRC Connection Reconfiguration message to the UE.

Intra-eNB HO

In case of intra-eNB HO, Steps 3, 4, 7, 11, 12 are not needed, as the source and target eNBs are actually the same type of logical node.

Example embodiments of a method performed by the source network node 241 will now be described in a more general way with reference to the flowchart depicted in FIG. 4. The method is performed by the source network node 241 for handover of the wireless communication device 223 in the first wireless communications network 201 using the first RAT. As mentioned above, the first RAT may be a 3GPP RAT, e.g. a 3GPP cellular RAT, such as LTE. The handover is to be performed from the source network node 241 to a target network node 242. The wireless communication device 223 is configured to communicate with the source network node 241 directly, e.g. through the source cell 261, and to communicate with the source network node 241 via a radio access node 212*a* such as a WT in the second wireless communications network 202 using the second RAT. The second RAT may be a WLAN. The source network node 241 and the target network node 242 may be the same type of logical node.

The method comprises the following actions, which actions may be performed in any suitable order;

Action 401

The source network node 241 provides the target network node 242 with information about parameters relating to a communication, also referred to as an ongoing communication, between the wireless communication device 223 and the source network node 241 via the radio access node 212*a*.

The information about the parameters may comprise one or more out of:

An identity of the radio access node 212*a* in the second wireless communications network 202. The identity of the radio access node 212*a* may be a WT ID.

An identity of the wireless communication device 223 in the second wireless communications network 202. This may be a WLAN identity of the wireless communication device 223.

A security key related to communication between the wireless communication device 223 and the first wireless communications network 201. The security key may be a PDCP security key, e.g. KeNB. The KeNB may be derived in the source network node and sent to the target network node. So it is related to the target cell;

A first mobility set configured for the wireless communication device 223 in the source cell 261.

Action 402

The source network node 241 receives a feedback from the target network node 242. The feedback comprises an indication of whether or not the radio access node 212a was able to keep a context of the wireless communication device 223 in the second wireless communications network 202. The indication is derived based on the information about the parameters.

The indication of whether or not the radio access node 212a was able to keep a context of the wireless communication device 223 in the second wireless communications network 202 may be received in a HANDOVER REQUEST ACKNOWLEDGE message from the target network node 242.

The context comprises an identity of the wireless communication device 223 in the second wireless communications network 202. The context further comprises information, such as e.g. a mobility set, required to interact with the wireless device 223 in the second wireless communications network 202. The "context kept" indication, "yes/no" at a minimum, may e.g. be passed from the WT, to the target eNB and to the source eNB, so that the source eNB knows that the WLAN connection should not be torn down when handing over the UE to the target eNB, thereby maintaining the highest possible bit rate for the combined radio connections.

In some embodiments, the information about parameters is provided to the target network node 242 in an X2AP HANDOVER REQUEST message. In some embodiments the radio access node 212a is represented by a WT. In these embodiments, the information about parameters may be represented by, e.g. comprise, a UE Context Reference at the at the WT Information Element, IE, in the X2AP HANDOVER REQUEST message.

Action 403

In some embodiments, the source network node 241 sends to the radio access node 212a, the indication of whether or not the radio access node 212a was able to keep a context of the wireless communication device 223 in the second wireless communications network 202.

In some embodiments, the radio access node 212a is represented by a WT. In these embodiments, the indication of whether or not the radio access node 212a was able to keep a context of the wireless communication device 223 in the second wireless communications network 202 is sent to the WT in a WT RELEASE REQUEST message.

The indication of whether or not the radio access node 212a was able to keep a context of the wireless communication device 223 in the second wireless communications network 202 may be represented by a UE Context kept indicator indicating that the wireless communication device 223 was able to keep the UE context.

A computer program 691 comprising instructions is provided, which when executed e.g. by means of an executing module 630 or by a processor 680 e.g. in the source network node 241, cause the processor 680 to perform any of the actions 401-403.

A carrier 692 comprising the computer program 691 is provided, wherein the carrier 692 is one of an electronic signal, an optical signal, an electromagnetic signal, a magnetic signal, an electric signal, a radio signal, a microwave signal, or a computer-readable storage medium.

Example embodiments of a method performed by the target network node 242 will now be described in a more general way with reference to the flowchart depicted in FIG. 5a. The method is performed by the target network node 242 for handover of the wireless communication device 223 in the first wireless communications network 201 using the first RAT: The first RAT may be a 3GPP RAT, e.g. a 3GPP cellular RAT, such as LTE. The handover is to be performed from the source network node 241 to the target network node 242. The wireless communication device 223 is configured to communicate with the source network node 241 directly e.g. through the source cell 261, and to communicate with the source network node 241 via a radio access node 212a such as a WT in the second wireless communications network 202 using a second RAT. The second RAT may be a WLAN. The source network node 241 and the target network node 242 may be the same type of logical node.

Dashed boxed in FIG. 5a represents optional actions. The method comprises the following actions, which actions may be performed in any suitable order:

Action 501

The target network node 242 obtains from the source network node 241, information about parameters relating to a communication between the wireless communication device 223 and the source network node 241 via the radio access node 212a. The obtaining may be performed by receiving from the source network node 241, a handover request relating to the wireless communication device 223.

The information about parameters may be obtained in an X2AP HANDOVER REQUEST message.

In some embodiments, the radio access node 212a is represented by a WT. In these embodiments, the information about parameters may be represented by a User Equipment, UE, Context Reference at the at the WT Information Element, IE, in the X2AP HANDOVER REQUEST message.

The information about the parameters may comprise one or more out of:

An identity of the radio access node 212a in the second wireless communications network 202. The identity of the radio access node 212a may be a WT ID.

An identity of the wireless communication device 223 in the second wireless communications network 202. This may be a WLAN identity of the wireless communication device 223.

A security key related to communication between the wireless communication device 223 and the first wireless communications network 201. The security key may be a PDCP security key, e.g. KeNB. The KeNB may be derived in the source network node and sent to the target network node. So it is related to the target cell.

A first mobility set configured for the wireless communication device 223 in the source cell 261.

Action 502

The target network node 242 may in some embodiments, receive an acknowledge of a request for addition of the radio access node 212a in the second wireless communications network 202. The acknowledge of the request comprises the indication of whether or not the radio access node 212a in the second wireless communications network 202 was able to keep a context of the wireless communication device 223.

The indication may be derived based on the information about parameters relating to the communication between the wireless communication device 223 and the source network node 241 via the radio access node 212a. E.g, based on the information about the LWA connection between the source network node 241 such as the source eNB in LTE and the radio access node 212a such as the WT in WLAN, e.g. as specified with the example parameters above. The indication may be based on an evaluation by the radio access node 212*a* in the second wireless communications network 202 on e.g. traffic, configuration, and/or Quality-of-Service requested by the wireless communication device 223.

Action 503

The target network node 242 transmits a feedback to the source network node 241. The feedback comprises an indication of whether or not the radio access node 212*a* was able to keep a context of the wireless communication device 223 in the second wireless communications network 202.

The indication of whether or not the radio access node 212*a* was able to keep a context of the wireless communication device 223 in the second wireless communications network 202 may be transmitted to the source network node 242 in a HANDOVER REQUEST ACKNOWLEDGE message.

The indication of whether or not the radio access node 212*a* was able to keep a context of the wireless communication device 223 in the second wireless communications network 202 may be represented by, e.g. comprise a UE Context kept indicator indicating that the wireless communication device 223 was able to keep the UE context.

The indication is derived based on the information about the parameters e.g. being represented by information about an LTE-WLAN Aggregation connection between the source network node 241 such as a source eNB related to LTE and the radio access node 212*a* such as a WT related to the WLAN.

The indication of whether or not the radio access node 212*a* in the second wireless communications network 202 was able to keep a context of the wireless communication device 223 may be based on an evaluation by the radio access node 212*a* in the second wireless communications network 202 on any one or more out of: traffic, configuration, and Quality-of-Service requested by the wireless communication device 223.

The context comprises an identity of the wireless communication device 223 in the second wireless communications network 202, and information such as e.g. a mobility set required to interact with the wireless device 223 in the second wireless communications network 202.

Action 504

The target network node 242 may in some embodiments, execute the handover of the wireless communication device 223 based on the received indication of whether or not the radio access node 212*a* in the second wireless communications network 202 was able to keep the context of the wireless communication device 223.

The execution may further be based on the information about parameters relating to the communication between the wireless communication device 223 and the source network node 241 via the radio access node 212*a*, e.g. further based on the second security key and the second mobility set.

A computer program 791 comprising instructions is provided, which when executed by the processor 780 e.g. comprised in the target network node 242, cause the processor 780 to perform any of the actions 501-504.

A carrier 792 comprising the computer program 791 may be provided, wherein the carrier 792 is one of an electronic signal, an optical signal, an electromagnetic signal, a magnetic signal, an electric signal, a radio signal, a microwave signal, or a computer-readable storage medium.

Example embodiments of the source network node 241 for handover of a wireless communication device 223 in the first wireless communications network 201 using the first RAT will now be described in a more general way with reference to FIG. 6. The first RAT may be a 3GPP RAT, e.g. a 3GPP cellular RAT, such as LTE. The handover is to be performed from the source network node 241 to the target network node 242. The wireless communication device 223 is configured to communicate with the source network node 241 directly e.g. through the source cell 261, and to communicate with the source network node 241 via a radio access node 212*a* such as a WLAN Termination in the second wireless communications network 202 using a second RAT. The second RAT may be a WLAN.

The source network node 241 is configured to, e.g. by means of a transmitting module 610, provide the target network node 242 with information about parameters relating to a communication between the wireless communication device 223 and the source network node 241 via the radio access node 212*a*.

The source network node 241 is configured to, e.g. by means of a receiving module 620, receive a feedback from the target network node 242. The feedback comprises an indication of whether or not the radio access node 212*a* was able to keep a context of the wireless communication device 223 in the second wireless communications network 202. The indication is derived based on the information about the parameters. The context comprises an identity of the wireless communication device 223 in the second wireless communications network 202, and information such as e.g. a mobility set, required to interact with the wireless device 223 in the second wireless communications network 202.

The transmitting may be performed by means of the transmitting module 610 in the source network node 241.

The receiving may be performed by means of the receiving module 620 in the source network node 241.

The information about parameters may be adapted to be provided to the target network node 242 in an X2AP HANDOVER REQUEST message.

The radio access node 212*a* may in some embodiments be represented by a WT. In these embodiments, the information about parameters may be adapted to be represented by a UE Context Reference at the at the WT Information Element, IE, in the X2AP HANDOVER REQUEST message.

The indication of whether or not the radio access node 212*a* was able to keep a context of the wireless communication device 223 in the second wireless communications network 202 may be adapted to be received in a HANDOVER REQUEST ACKNOWLEDGE message from the target network node 242.

The source network node 241 may further being configured to, e.g. by means of the transmitting module 610, send to the radio access node 212*a*, the indication of whether or not the radio access node 212*a* was able to keep a context of the wireless communication device 223 in the second wireless communications network 202.

In some embodiments, the radio access node 212*a* is represented by a WT. In these embodiments, the source network node 241 may further be configured to send the indication of whether or not the radio access node 212*a* was able to keep a context of the wireless communication device 223 in the second wireless communications network 202 to the WT in a WT RELEASE REQUEST message.

The indication of whether or not the radio access node 212*a* was able to keep a context of the wireless communication device 223 in the second wireless communications network 202 may be adapted to be represented by a UE Context kept indicator indicating that the wireless communication device 223 was able to keep the UE context.

The information about the parameters may be adapted to comprise one or more out of:

An identity of the radio access node 212a in the second wireless communications network 202. The identity of the radio access node 212a may be a WT ID.

An identity of the wireless communication device 223 in the second wireless communications network 202. This may be a WLAN identity of the wireless communication device 223.

A security key related to communication between the wireless communication device 223 and the first wireless communications network 201. The security key may be a PDCP security key, e.g. KeNB. The KeNB may be derived in the source network node and sent to the target network node. So it is related to the target cell.

A first mobility set configured for the wireless communication device 223 in the source cell 261.

The source network node 241 and the target network node 242 may be the same type of logical node.

Example embodiments of the target network node 242 for handover of the wireless communication device 223 in the first wireless communications network 201 using the first RAT will now be described in a more general way with reference to FIG. 7. The first RAT may be a 3GPP RAT, e.g. a 3GPP cellular RAT, such as LTE The handover is to be performed from the source network node 241 to the target network node 242. The wireless communication device 223 is configured to communicate with the source network node 241 directly e.g. through the source cell 261, and to communicate with the source network node 241 via a radio access node 212a in a second wireless communications network 202 using a second RAT. The second RAT may be a WLAN.

The target network node 242 is configured to e.g. by means of an obtaining module 710, obtain from the source network node 241, information about parameters relating to a communication between the wireless communication device 223 and the source network node 241 via the radio access node 212a. The obtaining may be performed by receiving, from the source network node 241, a handover request relating to the wireless communication device 223.

The target network node 242 is further configured to, e.g. by means of a transmitting module 720, transmit a feedback to the source network node 241. The feedback comprises an indication of whether or not the radio access node 212a was able to keep a context of the wireless communication device 223 in the second wireless communications network 202. The indication is derived based on the information about the parameters. The context comprises an identity of the wireless communication device 223 in the second wireless communications network 202, and information required to interact with the wireless device 223 in the second wireless communications network 202.

In some embodiments, the information about parameters is adapted to be obtained in an X2AP HANDOVER REQUEST message.

In some embodiments, the radio access node 212a is represented by a WT. In these embodiments, the information about parameters may be represented by a User Equipment, UE, Context Reference at the at the WT Information Element, IE, in the X2AP HANDOVER REQUEST message.

The target network node 242 may further be configured to, e.g. by means of the transmitting module 720, transmit the indication of whether or not the radio access node 212a was able to keep a context of the wireless communication device 223 in the second wireless communications network 202 to the source network node 242 in a HANDOVER REQUEST ACKNOWLEDGE message.

The indication of whether or not the radio access node 212a was able to keep a context of the wireless communication device 223 in the second wireless communications network 202 may be adapted to be represented by a UE Context kept indicator indicating that the wireless communication device 223 was able to keep the UE context.

The target network node 242 according to claim 43, wherein the indication is adapted to be derived based on the information about the parameters being represented by information about an LTE-WLAN Aggregation connection between the source network node 241 such as the source eNB related to LTE, and the radio access node 212a such as a WT related to the WLAN.

The information about the parameters may be adapted to comprise one or more out of:

An identity of the radio access node 212a in the second wireless communications network 202. The identity of the radio access node 212a may be a WT ID.

An identity of the wireless communication device 223 in the second wireless communications network 202. This may be a WLAN identity of the wireless communication device 223.

A security key related to communication between the wireless communication device 223 and the first wireless communications network 201. The security key may be a PDCP security key, e.g. KeNB. The KeNB may be derived in the source network node and sent to the target network node. So it is related to the target cell.

A first mobility set configured for the wireless communication device 223 in the source cell 261.

The indication of whether or not the radio access node 212a in the second wireless communications network 202 was able to keep a context of the wireless communication device 223 may be adapted to be based on an evaluation by the radio access node 212a in the second wireless communications network 202 on any one or more out of: traffic, configuration, and Quality-of-Service requested by the wireless communication device 223.

The source network node 241 and the target network node 242 may be the same type of logical node.

The target network node 242 may further be configured to, e.g. by means of the obtaining module 710, receive an acknowledge of a request for addition of the radio access node 212a in the second wireless communications network 202. The acknowledge of the request may comprise the indication of whether or not the radio access node 212a in the second wireless communications network 202 was able to keep a context of the wireless communication device 223.

The target network node 242 may further be configured to, e.g. by means of an executing module 730, execute the handover of the wireless communication device 223 based on the received indication of whether or not the radio access node 212a in the second wireless communications network 202 was able to keep the context of the wireless communication device 223.

The execution may further be based on the information about parameters relating to the communication between the wireless communication device 223 and the source network node 241 via the radio access node 212a, e.g. further based on the second security key and the second mobility set.

The obtaining may be performed by means of the obtaining module 710 in the target network node 242.

The transmitting may be performed by means of the transmitting module 720 in the target network node 242.

The executing may be performed by means of the executing module 730 in the target network node 242. The executing module may be, at least in part, implemented by the transmitting module 720.

Some embodiments herein relate to the following examples:

X2AP Support for Inter-eNB Mobility without WT Change

In an inter-eNB handover, in case the source and target cells overlap with the same WT, LWA may continue without interruption at handover according to embodiments herein. Similarly to a Dual Connectivity (DC) case, the WT context reference of the UE is signalled to the target eNB, which must be able to signal to the source eNB whether the UE context could be kept. The mobility set for the UE may also be needed to be signaled to the target eNB.

The procedure to perform X2 Handover while keeping the LWA connection may be as follows:

1) The UE Context Reference at the WT Information Element (IE), e.g. including the Mobility Set IE, is added to the HANDOVER REQUEST message, with an appropriate behaviour text;

2) A WT UE Context Kept Indicator IE is added to the HANDOVER REQUEST ACKNOWLEDGE message, with an appropriate behaviour text. The appropriate behaviour may require the receiving node, if supported, to only initiate the release of resources related to the UE-associated signalling connection between the two nodes.

3) Appropriate IE definitions; for the "context kept indicator" and for the UE identifier with respect to the WT;

4) Abstract Syntax Notation (ASN).1 change; corresponding to the above definitions;

XwAP Support for Inter-eNB Mobility without WT Change

In an inter-eNB handover, in case the source and target cells overlap with the same WT, LWA can continue without interruption at handover. Once the target eNB has successfully added the WT for the UE handed over, the source eNB needs to release the WT indicating that the UE context is to be kept.

The procedure to perform X2 Handover while keeping the LWA connection may be as follows:

1) Add the WT UE XwAP ID IE, previously assigned by the WT, to the WT ADDITION REQUEST message; in case this IE is signaled, the value included in the UE Identity IE is ignored; The target eNB sends to the WT the UE identifier previously assigned for the same UE (which the target eNB had received from the source eNB). This signals to the WT that the addition request is concerning a UE for which a context has already been set up.

2) Add UE Context Kept Indicator IE to the WT RELEASE REQUEST message, with the appropriate behaviour text; When receiving this indication, the WT understands that it should only remove the part of the UE context concerning the source eNB (which sends this message) and not the target eNB.

3) Appropriate IE definition for the "context kept" indicator above;

4) ASN.1 change corresponding to the above definitions.

E.g., the term "mobility without WT change" refers to the fact that the UE is associated to the same WT before and after mobility. The UE, however, has no knowledge of the WT; as far as the UE is concerned, a re-association with the WLAN seems to be required after the UE has connected to the target cell (due to e.g. authentication and encryption issues). With respect to Dual Connectivity, the main difference is that the UE has no knowledge of the WT; UE re-association with WLAN seems to be required after the UE has connected to the target cell.

E.g. in case of intra-eNB handover, the eNB can send the new key S-Kwt to the WT using the current WT MODIFICATION REQUEST message It seems beneficial for the target eNB to also know the current mobility set for the UE: assuming the same mobility set to be valid also in the target cell, this will enable the target eNB to either use it as a "starting point" for further configuring the UE, thus helping to minimize LWA service interruption, or replace/modify it with a known good mobility set for the target cell, thus helping to minimize LWA service interruption. The current mobility set can be sent from the source to the target eNB during the X2 Handover Preparation procedure.

E.g., it seems also beneficial for the target eNB to receive current WLAN measurements from the UE, as an aid for further UE configuration and mobility set selection. This information can be included by the source eNB in the RRC Context IE signaled in the HANDOVER REQUEST message, without specification impact.

The source eNB may include current WLAN measurements from the UE in the RRC Context IE in the HANDOVER REQUEST message, without specification impact.

For example: The source eNB sends the UE context reference at the WT and the mobility set for the UE in the X2 HANDOVER REQUEST message to the candidate target eNB; the target eNB uses this information to configure LWA for the UE.

The receiving target eNB may either use the received mobility set as a "starting point" for further configuring the UE, or replace/modify it with a "known good" mobility set for the target cell, thus helping to minimize LWA service interruption to set up LWA to the same WT and configure the UE for LWA.

The target eNB needs to request a WT addition before the UE actually connects to it: hence, a WLAN identity for the UE needs to be signalled from the source eNB in the HANDOVER REQUEST message. This same WLAN UE identity will be then sent from the target eNB to the WT in the WT ADDITION REQUEST message. For this purpose, either the WLAN MAC address or the existing WT UE XwAP ID already assigned by the WT may be used. The following impact may be observed:

In case the WLAN MAC address is used, there is no impact on the WT ADDITION REQUEST message, but this address needs to be also signalled in the X2AP HANDOVER REQUEST message (which does not seem desirable).

In case the existing WT UE XwAP ID is used, this requires adding the new IE and new handling to ignore the existing (mandatory) UE Identity IE in the WT ADDITION REQUEST message, as well as introducing this IE in the X2AP HANDOVER REQUEST message. However, signalling protocol-level identifiers seems like a better practice.

The target eNB may either use the received mobility set as a "starting point" for further configuring the UE, or replace/modify it with a "known good" mobility set for the target cell, thus helping to minimize LWA service interruption.

For example: The UE WLAN MAC address and existing WT UE XwAP ID is signaled from the source to the target eNB as part of the UE context reference in the HANDOVER REQUEST message.

E.g. the UE Context Kept Indicator IE may be reused, already defined in X2AP for DC, also for the LWA case;

however, that would preclude the possibility of handing over a UE with both ongoing DC and LWA. Although such a possibility seems remote, it does not seem wise to preclude it in signalling, given that a new indicator requires only a single bit to be added.

Figure 6:
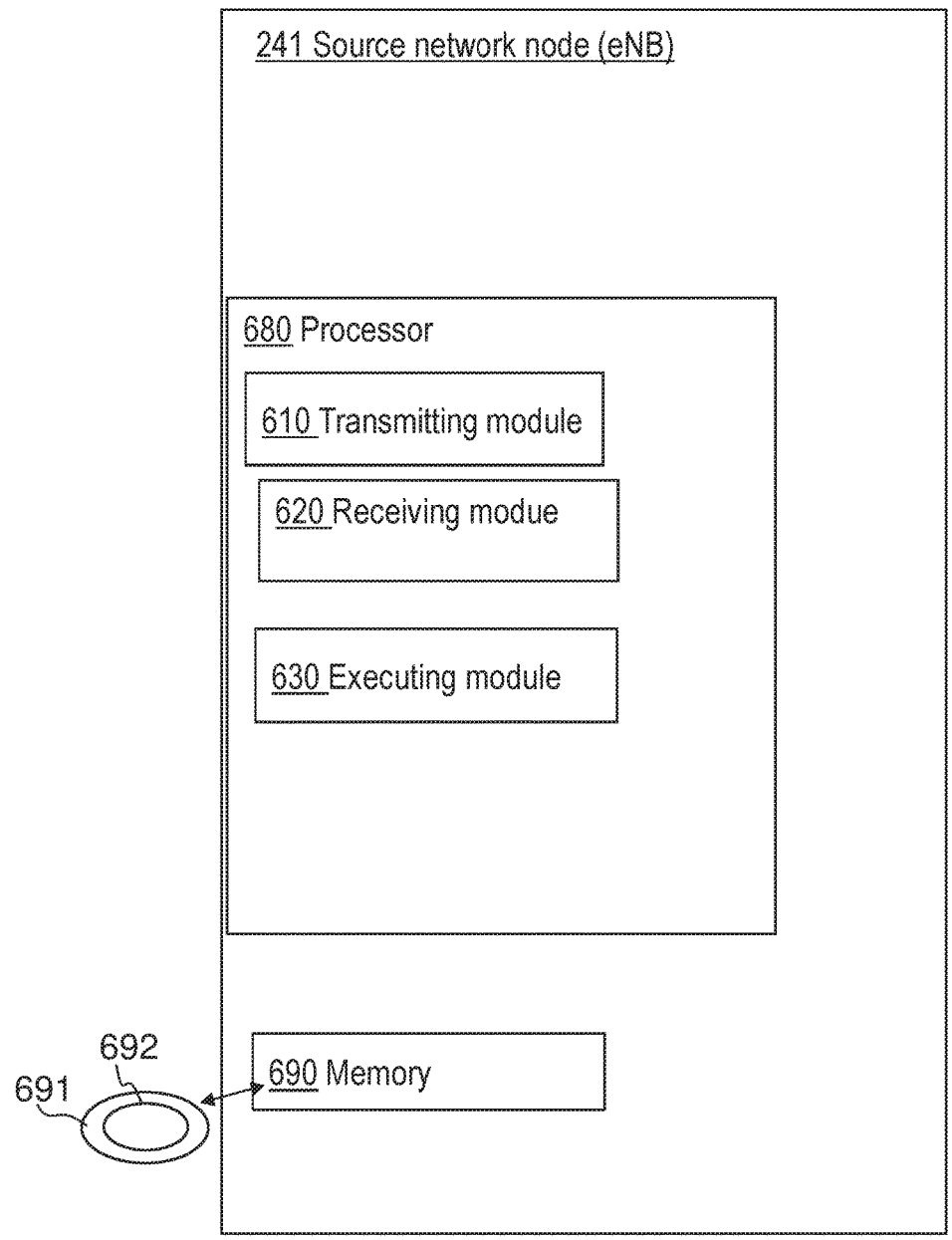
FIG. 6 is a schematic block diagram illustrating embodiments of a source network node.
Figure 7:
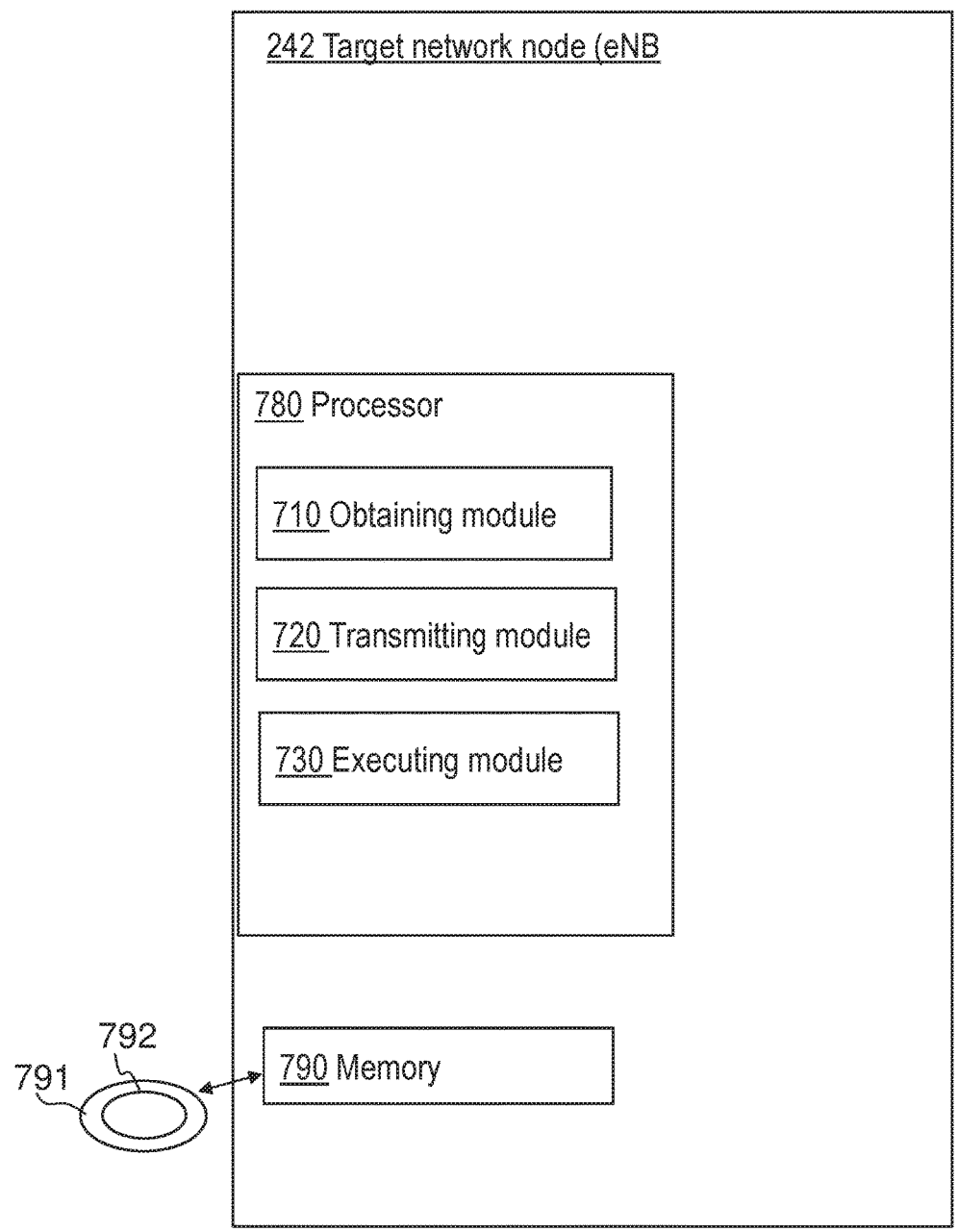
FIG. 7 is a schematic block diagram illustrating embodiments of a target network node.

The embodiments herein may be implemented through one or more processors, such as the processor 680 in the source network node 241 depicted in FIG. 6, and the processor 780 in the target network node 242 depicted in FIG. 7 together with computer program code for performing the functions and actions of the embodiments herein. The program code mentioned above may also be provided as a computer program product, for instance in the form of a data carrier carrying computer program code for performing the embodiments herein when being loaded into the source network node 241 and the target network node 242. One such carrier may be in the form of a CD ROM disc. It is however feasible with other data carriers such as a memory stick. The computer program code may furthermore be provided as pure program code on a server and downloaded to the source network node 241 and target network node 242.

Thus, the methods according to the embodiments described herein for the source network node 241 and the target network node 242 may be implemented by means of a computer program product, comprising instructions, i.e., software code portions, which, when executed on at least one processor, cause the at least one processor to carry out the actions described herein, as performed by the source network node 241 and the target network node 242. The computer program product may be stored on a computer-readable storage medium. The computer-readable storage medium, having stored there on the computer program, may comprise the instructions which, when executed on at least one processor, cause the at least one processor to carry out the actions described herein, as performed by the source network node 241 and the target network node 242. In some embodiments, the computer-readable storage medium may be a non-transitory computer-readable storage medium.

The source network node 241 and the target network node 242 may further each comprise a memory 690, 790, comprising one or more memory units. The memory 690, 790 is arranged to be used to store obtained information such as indications of a mobility set, identifiers of APs and WLANs, identifiers of UEs, ciphering keys, measurements of signals from radio access nodes, measurement reports or parts thereof and applications etc. to perform the methods herein when being executed in the source network node 241 and the target network node 242.

Some exemplary embodiments are described below:

A method performed by a source network node 241 for handover of a wireless communication device 223 in a first wireless communications network 201 using a first Radio Access Technology, RAT. See FIGS. 2, 3 and 4.

The handover may e.g. be performed between a source cell 261 and a target cell 262. The source cell 261 may be associated with the source network node 241 and the target cell may be associated with a target network node 242. In some embodiments the source network node 241 and the target network node 242 are the same type of logical node.

The wireless communication device 223 is configured to communicate with the source network node 241 directly, e.g. through the source cell 261. The first RAT may be a 3GPP RAT, e.g. a 3GPP cellular RAT, such as LTE.

The wireless communication device 223 is further configured to communicate with the source network node 241 via a radio access node 212a, such as a WLAN Termination in a second wireless communications network 202 using a second RAT. The second RAT may be a WLAN.

A handover preparation may be triggered by the mobility of the wireless communication device 223. For example the wireless communication device 223 may be moving from the source cell 261 to the target cell 262.

The method comprising one or more out of:

Providing 401 the target network node 242 with information about parameters relating to the communication between the wireless communication device 223 and the source network node 241 via the radio access node 212a. E.g. the information may be about an LWA connection between an eNB in LTE and an WT in WLAN.

The providing may be performed by transmitting FIG. 3 step 3, 401, to the target network node 242, a handover request relating to the wireless communication device 223. The handover request may comprise one or more out of:

an identity of the radio access node 212a in the second wireless communications network 202. The identity of the radio access node 212a may be a WT ID;

an identity of the wireless communication device 223 in the second wireless communications network 202. This may be a WLAN identity of the wireless communication device 223; and a security key related to communication between the wireless communication device 223 and the first wireless communications network 201. The security key may be a PDCP security key, e.g. KeNB. The KeNB may be derived in the source network node and sent to the target network node. So it is related to the target cell;

a first mobility set configured for the wireless communication device 223 in the source cell 261; and receiving FIG. 3, step 7, 402 a feedback on the handover request, e.g. an acknowledgement of the handover request, from the target network node 242, comprising an indication of whether or not the radio access node 212a in the second wireless communications network 202 was able to keep a context of the wireless communication device 223. The context of the wireless communication device 223 comprises the identity of the wireless communication device 223 and all the information required to interact with the wireless device 223. The indication is derived based on the information about parameters relating to the communication between the wireless communication device 223 and the source network node 241 via the radio access node 212a. E.g. based on the information about the LWA connection between the eNB in LTE and the WT in WLAN, e.g. as specified with the example parameters above.

The transmitting may be performed by means of a transmitting module 610 in the source network node 241.

The receiving may be performed by means of a receiving module 620 in the source network node 241.

The indication of whether or not the radio access node 212a in the second wireless communications network 202 was able to keep a context of the wireless communication device 223 may be based on an evaluation by the radio access node 212a in the second wireless communications network 202 on e.g. traffic, configuration, and/or Quality-of-Service requested by the wireless communication device 223.

Since the source network node transmits the identity of the WT, the WLAN ID of the UE, the mobility set and the security key related to PDCP in the HO request the handover of the UE from source RAN node to target RAN node is improved since the UE is configured for the new LWA connection faster. For example, the target eNB may configure the new mobility set already in step 4, WT may be configured with new second mobility set and new second security key already in step 5.

If it receives that indicator, the source eNB knows that the WT has agreed to keep the LWA ongoing. Therefore, it can proceed with the LTE handover without requesting the WT to remove the LWA first. It will send that request to the WT only after the LTE handover has completed, but with the "UE Context Kept Indicator": this tells the WT to only remove the part of the UE context related to the source eNB and not the complete UE context.

According to a second example aspect of embodiments herein, the object is achieved by a method performed by a target network node 242 for handover of a wireless communication device 223 in a first wireless communications network 201 using a first Radio Access Technology, RAT, See FIGS. 2, 3 and 5*b*.

The handover may e.g. be performed between a source cell 261 and a target cell 262. The source cell 261 may be associated with a source network node 241 and the target cell 262 may be associated with the target network node 242. In some embodiments the source network node 241 and the target network node 242 are the same type of logical node.

The wireless communication device 223 is configured to communicate with the source network node 241 directly, e.g. through the source cell 261. The first RAT may be a 3GPP RAT, e.g. a 3GPP cellular RAT, such as LTE.

The wireless communication device 223 is further configured to communicate with a source network node 241 via a radio access node 212*a*, such as a WLAN Termination in a second wireless communications network 202 using a second RAT. The second RAT may be a WLAN.

A handover preparation may be triggered by the mobility of the wireless communication device 223. For example the wireless communication device 223 may be moving from the source cell 261 to the target cell 262.

The method comprising any one out of:

Obtaining FIG. 3, step 3, FIG. 5*b*, 501*b* during handover preparation of the wireless communication device 223 information about parameters relating to the communication between the wireless communication device 223 and the source network node 241 via the radio access node 212*a*. E.g. the information may be about an LWA connection between an eNB in LTE and an WT in WLAN. The information may comprise one or more out of:

an identity of the radio access node 212*a* in the second wireless communications network 202;

an identity of the wireless communication device 223 in the second wireless communications network 202; and a first security key related to communication between the wireless communication device 223 and the first wireless communications network 201 in the target cell 261;

a first mobility set configured for the wireless communication device 223 in the source cell 261. The mobility set may be a network of RAN nodes in the second wireless communications network 202, e.g. WLANs. The first mobility set may comprise the RAN nodes, e.g. the WLANs, that the source RAN node 241 has indicated to the wireless communication device 223 and which the wireless communication device 223 may or is allowed to perform mobility between. In the case of LTE WLAN Aggregation a mobility set is a set of WLANs that comprise the WLANs that the eNB has indicated to the UE and which the UE may or is allowed to perform mobility between; and transmitting FIG. 3, step 5, 502*b* of FIG. 5*b* a request for addition of the radio access node 212*a* in the second wireless communications network 202. The request is sent to the radio access node 212*a* in the second wireless communications network 202 based on the obtained identity of the radio access node 212*a* in the second wireless communications network 202. The request may indicate/comprise:

the identity of the wireless communication device 223 in the second wireless communications network 202;

a second security key related to communication between the wireless communication device 223 and the radio access node 212*a* in the second wireless communications network 202. The second security key may be derived from the obtained first security key;

a second mobility set configured for the wireless communication device 223 in the target cell 262, which second mobility set is derived based on the obtained first mobility set;

receiving FIG. 3, step 6, 503*b* of FIG. 5*b* an acknowledge of the request for addition of the radio access node 212*a* in the second wireless communications network 202. The acknowledge of the request comprises an indication of whether or not the radio access node 212*a* in the second wireless communications network 202 was able to keep a context of the wireless communication device 223. The indication is derived based on the information about parameters relating to the communication between the wireless communication device 223 and the source network node 241 via the radio access node 212*a*, E.g, based on the information about the LWA connection between the eNB in LTE and the WT in WLAN, e.g. as specified with the example parameters above. The indication may be based on an evaluation by the radio access node 212*a* in the second wireless communications network 202 on e.g. traffic, configuration, and/or Quality-of-Service requested by the wireless communication device 223; and executing FIG. 3 step 7, 504*b* of FIG. 5*b* handover of the wireless communication device 223. The execution may be based on the received indication of whether or not the radio access node 212*a* in the second wireless communications network 202 is able to keep the context of the wireless communication device 223. The execution may further be based on the information about parameters relating to the communication between the wireless communication device 223 and the source network node 241 via the radio access node 212*a*, e.g. further based on the second security key and the second mobility set.

The obtaining may be performed by means of an obtaining module 710 in the target network node 242.

The transmitting may be performed by means of a transmitting module 720 in the target network node 242.

The executing may be performed by means of an executing module 730 in the target network node 242. The executing module may be, at least in part, implemented by the transmitting module 720.

In some embodiments the source cell 261 is associated with the source network node 241 in the first wireless communications network 201. In that scenario the target network node 242 may obtain FIG. 3, step 3 the identity of the radio access node 212*a* in the second wireless communications network 202;

the identity of the wireless communication device 223 in the second wireless communications network 202;

the first security key; and the first mobility set in a handover request message received from the source network node 241. The target network node 242 may then execute handover of the wireless communication device 223 by transmitting FIG. 3, step 7 a handover request acknowledge message to the source network node 241. The handover request acknowledge may comprise the indication of whether or not the radio access node 212a in the second wireless communications network 202 is able to keep the context of the wireless communication device 223.

As mentioned above, in some embodiments the source cell 261 and the target cell 262 are both associated with the target network node 242.

In some embodiments the target network node 242 derives FIG. 3, step 4 the second mobility set based on the obtained first mobility set.

By transmitting the WLAN ID of the UE and the KeNB to the WT the handover of the UE from first RAN node to second RAN node is improved since the UE is configured for the new LWA connection faster.

According to a third example aspect of embodiments herein, the object is achieved by a source network node 241 configured to perform the method according to the first aspect above. See FIGS. 2 and 6.

According to a fourth example aspect of embodiments herein, the object is achieved by a target network node 242 configured to perform the method according to the second aspect. See FIGS. 2 and 7.

As for the definition of context, it's basically the set of all information necessary to interoperate with the UE, including the UE identity, the bearer configuration, and any security-related information. At the WT, the UE context may comprise 2 different subsets: one related to the source eNB, and one related to the target eNB. For example, this may be the case if the target eNB changes the LWA bearer configuration for the UE with respect to the source eNB e.g. adds or removes bearers.

ABBREVIATIONS

Explain all abbreviations and acronyms used in the document.

Abbreviation Explanation
AC Access Controller
AP Access Point
CP Control Plane
E-UTRAN Evolved Universal Terrestrial Radio Access Network
eNB evolved NodeB
IE Information Element
LTE Long Term Evolution
LWA LTE-WLAN Aggregation
MME Mobility Management Entity
PDCP Packet Data Convergence Protocol
PDU Packet Data Unit
RLC Radio Link Control
RRC Radio Resource Control
S-GW Serving GateWay
SON Self-Organizing Networks
UE User Equipment
UP User Plane
WLAN Wireless Local Area Network
WT WLAN Termination

The invention claimed is:

1. A method performed by a source network node for handover of a wireless communication device in a first wireless communications network using a first Radio Access Technology (RAT), which handover is to be performed from the source network node to a target network node, which wireless communication device is configured to communicate with the source network node directly, and to communicate with the source network node via a radio access node in a second wireless communications network using a second RAT, the method comprising:
providing the target network node with information about parameters relating to a communication between the wireless communication device and the source network node via the radio access node;
receiving a feedback from the target network node, which feedback comprises an indication of whether or not the radio access node was able to keep a context of the wireless communication device in the second wireless communications network, which indication is derived based on the information about the parameters, and which context comprises an identity of the wireless communication device in the second wireless communications network and further comprises information required to interact with the wireless communication device in the second wireless communications network.

2. The method of claim 1, wherein the information about parameters is provided to the target network node in an X2AP HANDOVER REQUEST message.

3. The method of claim 2, wherein the radio access node is represented by a Wireless Local Area Network Termination (WT), and wherein the information about parameters is represented by a User Equipment (UE) Context Reference at the WT Information Element (IE) in the X2AP HANDOVER REQUEST message.

4. The method of claim 1, wherein the indication of whether or not the radio access node was able to keep a context of the wireless communication device in the second wireless communications network is received in a HANDOVER REQUEST ACKNOWLEDGE message from the target network node.

5. The method of claim 1, further comprising:
sending to the radio access node, the indication of whether or not the radio access node was able to keep a context of the wireless communication device in the second wireless communications network.

6. The method of claim 5, wherein the radio access node is represented by a Wireless Local Area Network Termination (WT), and wherein the indication of whether or not the radio access node was able to keep a context of the wireless communication device in the second wireless communications network is sent to the WT in a WT RELEASE REQUEST message.

7. The method of claim 1, wherein the indication of whether or not the radio access node was able to keep a context of the wireless communication device in the second wireless communications network is represented by a User Equipment (UE) Context kept indicator indicating that the wireless communication device was able to keep the UE context.

8. The method of claim 1, wherein the first RAT relates to Long Term Evaluation (LTE), and wherein the second RAT relates to a Wireless Local Area Network (WLAN).

9. The method of claim 1, wherein the information about the parameters comprises one or more out of:
an identity of the radio access node in the second wireless communications network,
an identity of the wireless communication device in the second wireless communications network, a security key related to communication between the wireless communication device and the first wireless communications network, and a first mobility set configured for the wireless communication device in the source cell.

10. The method of claim 1, wherein the source network node and the target network node are the same type of logical node.

11. A method performed by a target network node for handover of a wireless communication device in a first wireless communications network using a first Radio Access Technology (RAT), which handover is to be performed from a source network node to the target network node, which wireless communication device is configured to communicate with the source network node directly and to communicate with the source network node via a radio access node in a second wireless communications network using a second RAT, the method comprising:
  obtaining from the source network node, information about parameters relating to a communication between the wireless communication device and the source network node via the radio access node;
  transmitting a feedback to the source network node, which feedback comprises an indication of whether or not the radio access node was able to keep a context of the wireless communication device in the second wireless communications network, which indication is derived based on the information about the parameters, and which context comprises an identity of the wireless communication device in the second wireless communications network, and information required to interact with the wireless communication device in the second wireless communications network.

12. The method of claim 11, wherein the information about parameters is obtained in an X2AP HANDOVER REQUEST message.

13. The method of claim 12, wherein the radio access node is represented by a Wireless Local Area Network Termination (WT), and wherein the information about parameters is represented by a User Equipment (UE) Context Reference at the at the WT Information Element (IE) in the X2AP HANDOVER REQUEST message.

14. The method of claim 11, wherein the indication of whether or not the radio access node was able to keep a context of the wireless communication device in the second wireless communications network is transmitted to the source network node in a HANDOVER REQUEST ACKNOWLEDGE message.

15. The method of claim 11, wherein the indication of whether or not the radio access node was able to keep a context of the wireless communication device in the second wireless communications network is represented by a User Equipment (UE) Context kept indicator indicating that the wireless communication device was able to keep the UE context.

16. The method of claim 11, wherein the first RAT relates to Long Term Evaluation (LTE), and wherein the second RAT relates to a Wireless Local Area Network (WLAN).

17. The method of claim 16, wherein the indication is derived based on the information about the parameters being represented by information about an LTE-WLAN Aggregation connection between the source network node related to LTE and the radio access node related to the WLAN.

18. The method of claim 11, wherein the obtaining may be performed by receiving, from the source network node, a handover request relating to the wireless communication device.

19. The method of claim 11, wherein the information about the parameters comprises one or more out of:
  an identity of the radio access node in the second wireless communications network,
  an identity of the wireless communication device in the second wireless communications network,
  a security key related to communication between the wireless communication device and the first wireless communications network, and
  a first mobility set configured for the wireless communication device in the source cell.

20. The method of claim 11, wherein the indication of whether or not the radio access node in the second wireless communications network was able to keep a context of the wireless communication device is based on an evaluation by the radio access node in the second wireless communications network on any one or more out of: traffic, configuration, and Quality-of-Service requested by the wireless communication device.

21. The method of claim 11, wherein the source network node and the target network node are the same type of logical node.

22. The method of claim 11, further comprising:
  receiving an acknowledgement of a request for addition of the radio access node in the second wireless communications network, which acknowledgement of the request comprises the indication of whether or not the radio access node in the second wireless communications network was able to keep a context of the wireless communication device; and
  executing the handover of the wireless communication device based on the received indication of whether or not the radio access node in the second wireless communications network was able to keep the context of the wireless communication device.

23. A source network node for handover of a wireless communication device in a first wireless communications network using a first Radio Access Technology (RAT), which handover is to be performed from the source network node to a target network node, which wireless communication device is configured to communicate with the source network node directly, and to communicate with the source network node via a radio access node in a second wireless communications network using a second RAT, the source network node comprising:
  a processor; and
  memory, the processor and memory being configured to:
    provide the target network node with information about parameters relating to a communication between the wireless communication device and the source network node via the radio access node;
    receive a feedback from the target network node, which feedback comprises an indication of whether or not the radio access node was able to keep a context of the wireless communication device in the second wireless communications network,
    which indication is derived based on the information about the parameters, and which context comprises an identity of the wireless communication device in the second wireless communications network, and information required to interact with the wireless communication device in the second wireless communications network.

24. The source network node of claim 23, wherein the information about parameters is provided to the target network node in an X2AP HANDOVER REQUEST message.

25. The method of claim 24, wherein the radio access node is represented by a Wireless Local Area Network Termination (WT), and wherein the information about parameters is represented by a User Equipment (UE) Context Reference at the at the WT Information Element (IE) in the X2AP HANDOVER REQUEST message.

26. The source network node of claim 23, wherein the indication of whether or not the radio access node was able to keep a context of the wireless communication device in the second wireless communications network is received in a HANDOVER REQUEST ACKNOWLEDGE message from the target network node.

27. The source network node of claim 23, wherein the processor and memory are further configured to:
send to the radio access node, the indication of whether or not the radio access node was able to keep a context of the wireless communication device in the second wireless communications network.

28. The source network node of claim 27, wherein the radio access node is represented by a Wireless Local Area Network Termination (WT), and wherein the processor and memory are further configured to send the indication of whether or not the radio access node was able to keep a context of the wireless communication device in the second wireless communications network to the WT in a WT RELEASE REQUEST message.

29. The source network node of claim 23, wherein the indication of whether or not the radio access node was able to keep a context of the wireless communication device in the second wireless communications network is represented by a User Equipment (UE) Context kept indicator indicating that the wireless communication device was able to keep the UE context.

30. The source network node of claim 23, wherein the first RAT relates to Long Term Evaluation (LTE), and wherein the second RAT relates to a Wireless Local Area Network (WLAN).

31. The source network node of claim 23, wherein the information about the parameters comprises one or more out of:
an identity of the radio access node in the second wireless communications network,
an identity of the wireless communication device in the second wireless communications network,
a security key related to communication between the wireless communication device and the first wireless communications network, and
a first mobility set configured for the wireless communication device in the source cell.

32. The source network node of claim 23, wherein the source network node and the target network node are the same type of logical node.

33. A target network node for handover of a wireless communication device in a first wireless communications network using a first Radio Access Technology (RAT), which handover is to be performed from a source network node to the target network node, which wireless communication device is configured to communicate with the source network node directly, and to communicate with the source network node via a radio access node in a second wireless communications network using a second RAT, the target network node comprising:
a processor; and
memory, the processor and memory being configured to:
obtain from the source network node, information about parameters relating to a communication between the wireless communication device and the source network node via the radio access node,
transmit a feedback to the source network node, which feedback comprises an indication of whether or not the radio access node was able to keep a context of the wireless communication device in the second wireless communications network, which indication is derived based on the information about the parameters, and which context comprises an identity of the wireless communication device in the second wireless communications network, and information required to interact with the wireless communication device in the second wireless communications network.

34. The target network node of claim 33, wherein the information about parameters is obtained in an X2AP HANDOVER REQUEST message.

35. The target network node of claim 34, wherein the radio access node is represented by a Wireless Local Area Network Termination (WT), and wherein the information about parameters is represented by a User Equipment (UE) Context Reference at the at the WT Information Element (IE) in the X2AP HANDOVER REQUEST message.

36. The target network node of claim 33, wherein the processor and memory are further configured to transmit the indication of whether or not the radio access node was able to keep a context of the wireless communication device in the second wireless communications network to the source network node in a HANDOVER REQUEST ACKNOWLEDGE message.

37. The target network node of claim 33, wherein the indication of whether or not the radio access node was able to keep a context of the wireless communication device in the second wireless communications network is represented by a User Equipment (UE) Context kept indicator indicating that the wireless communication device was able to keep the UE context.

38. The target network node of claim 33, wherein the first RAT relates to Long Term Evaluation (LTE), and wherein the second RAT relates to a Wireless Local Area Network (WLAN).

39. The target network node of claim 38, wherein the indication is derived based on the information about the parameters being represented by information about an LTE-WLAN Aggregation connection between the source network node related to LTE and the radio access node related to the WLAN.

40. The target network node of claim 33, wherein the processor and memory are configured to perform the obtaining by receiving, from the source network node, a handover request relating to the wireless communication device.

41. The target network node of claim 33, wherein the information about the parameters comprises one or more out of:
an identity of the radio access node in the second wireless communications network,
an identity of the wireless communication device in the second wireless communications network,
a security key related to communication between the wireless communication device and the first wireless communications network, and
a first mobility set configured for the wireless communication device in the source cell.

42. The target network node of claim 33, wherein the indication of whether or not the radio access node in the second wireless communications network was able to keep a context of the wireless communication device is based on an evaluation by the radio access node in the second wireless communications network on any one or more out of: traffic, configuration, and Quality-of-Service requested by the wireless communication device.

43. The target network node of claim 33, wherein the source network node and the target network node are the same type of logical node.

44. The target network node of claim 33, wherein the processor and memory are further configured to:
receive an acknowledgement of a request for addition of the radio access node in the second wireless communications network, which acknowledgement of the request comprises the indication of whether or not the radio access node in the second wireless communications network was able to keep a context of the wireless communication device, and
execute the handover of the wireless communication device based on the received indication of whether or not the radio access node in the second wireless communications network was able to keep the context of the wireless communication device.

45. A non-transitory computer-readable medium comprising, stored thereupon, a computer program comprising instructions that, when executed by a processor of source network in a first communications network using a first Radio Access Technology (RAT), cause the processor to:
provide a target network node, for handover of a wireless communications device in the first communications network, with information about parameters relating to a communication between the wireless communication device and the source network node via a radio access node, wherein the wireless communication device is configured to communicate with the source network node directly and to further communicate with the source network node via a radio access node in a second wireless communications network using a second RAT;
receive a feedback from the target network node, which feedback comprises an indication of whether or not the radio access node was able to keep a context of the wireless communication device in the second wireless communications network, which indication is derived based on the information about the parameters, and which context comprises an identity of the wireless communication device in the second wireless communications network and further comprises information required to interact with the wireless communication device in the second wireless communications network.

46. A non-transitory computer-readable medium comprising, stored thereupon, a computer program comprising instructions that, when executed by a processor of a target network node for handover of a wireless communication device in a first wireless communications network using a first Radio Access Technology (RAT), which handover is to be performed from a source network node to the target network node, which wireless communication device is configured to communicate with the source network node directly and to communicate with the source network node via a radio access node in a second wireless communications network using a second RAT, cause the processor to:
obtain from the source network node, information about parameters relating to a communication between the wireless communication device and the source network node via the radio access node;
transmit a feedback to the source network node, which feedback comprises an indication of whether or not the radio access node was able to keep a context of the wireless communication device in the second wireless communications network, which indication is derived based on the information about the parameters, and which context comprises an identity of the wireless communication device in the second wireless communications network, and information required to interact with the wireless communication device in the second wireless communications network.

\* \* \* \* \*